United States Patent [19]

Stocklin et al.

[11] Patent Number: 5,170,429
[45] Date of Patent: Dec. 8, 1992

[54] PORTABLE TELECOMMUNICATIONS TEST INSTRUMENT WITH A TALK BATTERY CIRCUIT

[75] Inventors: Clay A. Stocklin, Redmond; David M. Rollins, Monroe; William P. Pierson, Everett, all of Wash.

[73] Assignee: Leviton Manufacturing Co., Inc., Little Neck, N.Y.

[21] Appl. No.: 771,467

[22] Filed: Oct. 4, 1991

[51] Int. Cl.⁵ .................... H04M 1/24; H04M 1/72; H04M 9/02
[52] U.S. Cl. ............................... 379/387; 379/21; 379/413; 379/457
[58] Field of Search ............... 379/21, 185, 186, 1, 379/387, 390, 413, 457

[56] References Cited

U.S. PATENT DOCUMENTS

| | | | |
|---|---|---|---|
| 3,870,836 | 3/1975 | Kusama | 379/21 |
| 4,292,480 | 9/1981 | Sweatt | 379/21 |
| 4,600,810 | 7/1986 | Feldman et al. | 379/21 |
| 4,682,346 | 7/1987 | Faith et al. | 379/22 |
| 4,691,336 | 9/1987 | Durston | 379/21 |

OTHER PUBLICATIONS

Catalog, *Progressive Electronics, Inc.*, Mar. 1989.

Primary Examiner—Stafford D. Schreyer
Attorney, Agent, or Firm—Seed and Berry

[57] ABSTRACT

A handheld, battery-powered telecommunications test instrument with a talk battery circuit capable of supplying power for up to four telephone sets, which may be connected either in series or in parallel. The instrument determines the configuration of the telephone sets as having serial connections or parallel connections by sensing the amount of current flowing through the circuit of the invention. In response to the amount of current, a transistor automatically operates to supply power to the telephone sets as either a voltage source or a current source and maximizes power transfer between the telephone sets. The instrument has a low power mode to reduce current drain on the battery that is automatically engaged when the telephone sets are not in use.

8 Claims, 8 Drawing Sheets

PORTABLE TELECOMMUNICATIONS TEST INSTRUMENT WITH A TALK BATTERY CIRCUIT

TECHNICAL FIELD

The invention relates generally to a telecommunications test instrument and, more particularly, to portable test instrument capable of powering remote telephone sets.

BACKGROUND OF THE INVENTION

Telecommunications test sets are used for a variety of tests, including the measurement of resistances, checking the continuity or discontinuity of a circuit, and monitoring the status of a telephone line. When wires are being installed or serviced, there is often more than one technician performing the task. Often, there is no convenient electrical power available to the technician at the job site. To solve the power problem and to help the technicians accomplish their tasks, many test sets are battery powered and have the ability to provide power for communication between remote locations over existing wires, provided that the wires are not currently used for other purposes. If the wire are in use, damage to the test set may result.

If the wires are available for communication between the technicians, the technicians connect their telephone sets (commonly called butt sets) to the wires. Power is provided for the telephone sets by the test set. Typically, the test set simply provides a voltage in series with a current limiting resistor. This circuit arrangement provides limited power for communications, resulting in weak signals at the telephone sets and a practical limit of powering two telephone sets.

It will, therefore, be appreciated that there is a significant need for a portable, battery powered telecommunications test set that will not be damaged if connected to active lines and has the capability of providing power for as many as four telephone sets.

SUMMARY OF THE INVENTION

The present invention resides in a portable, self-powered telecommunications test instrument for use by two or more persons with telephone sets at locations separate from each other with a pair of wires extending between the instrument and the locations of the two or more persons. The telephone sets are connected to the pair of wires. The instrument includes a case sized to be held in one hand and containing therein the circuitry of the instrument. The circuitry includes a battery, and a power source powered by the battery and supplying electrical power to the pair of wires to power the two or more telephone sets. The power source selectively operates as a voltage source or a current source.

The circuitry also includes means for connecting the power source to the pair of wires, and conversion means for automatically operating the power source as a voltage source when the telephone sets are connected in series and operating the power source as a current source when the telephone sets are connected in parallel. The instrument automatically converts the power source between operation as a current source and operation as a voltage source depending on the manner in which the telephone sets are connected at the locations.

In the illustrated embodiment, the conversion means converts the power source between a voltage source and a current source by sensing the amount of current flowing from the power source through the telephone sets connected to the pair of wires. Further, the conversion means causes the power source to operate as a voltage source if the current flow is below a predetermined value and to operate as a current source if the current flow is above the predetermined value.

The instrument also includes a speaker mounted in the case for monitoring communications over the pair of wires between telephone sets connected thereto at locations remote from the instrument.

Other features and advantages of the inventions will become apparent from the following detailed description, taken in conjunction with the accompanying drawings.

BRIEF DESCRIPTION OF THE DRAWINGS

FIG. 17 is a schematic diagram of a monitor probe circuit of the present invention.

DETAILED DESCRIPTION OF THE INVENTION

Figure 1:
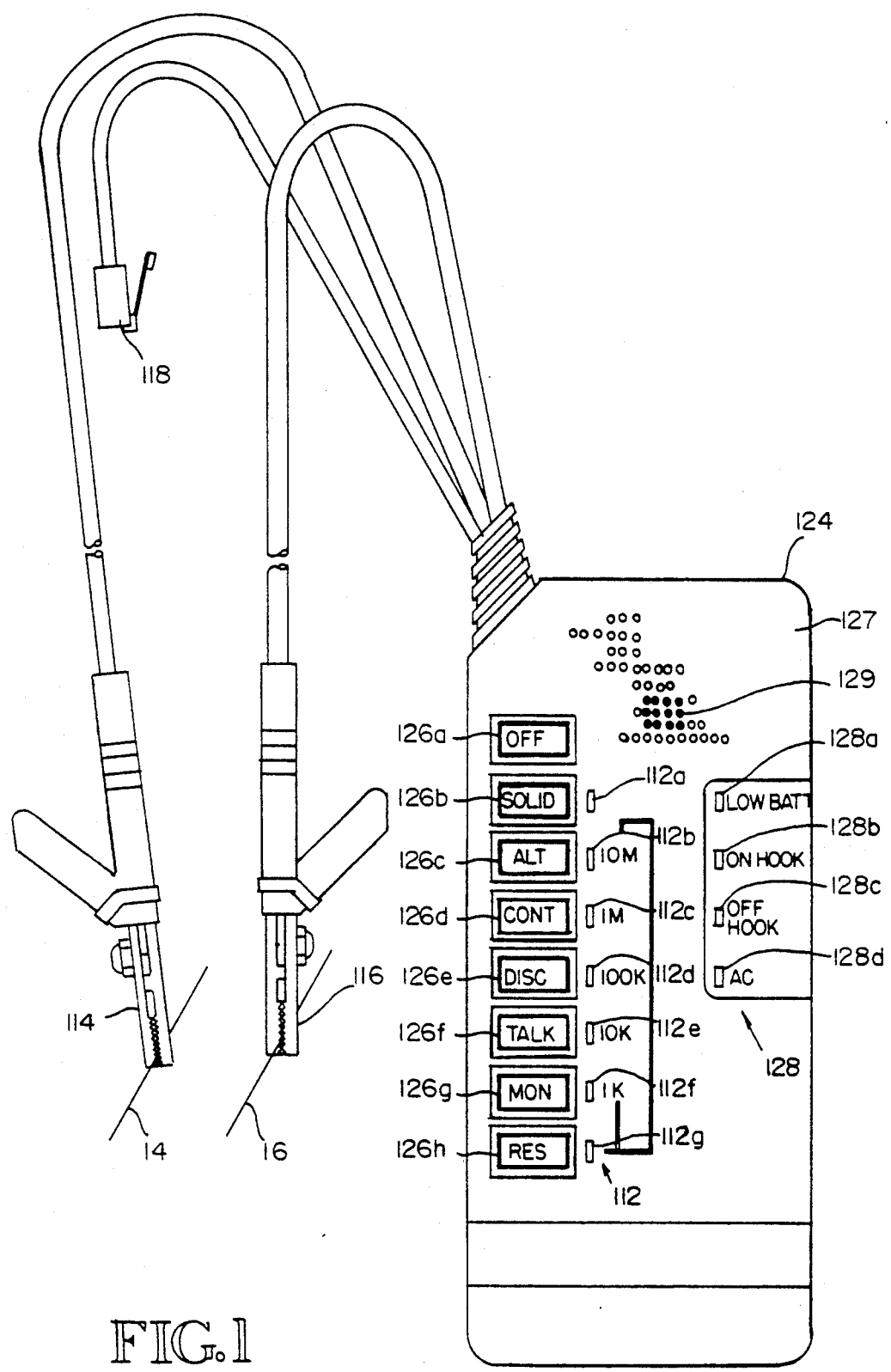
FIG. 1 is a front view of the instrument of the present invention.

As shown in the drawings for purposes of illustration, the present invention is embodied in a telecommunications test instrument 100 designed to meet all of the portable test equipment needs of the typical telephone installation technician as well as other technicians and craftpersons. As shown in FIG. 1, the instrument 100, contained within a single hand held case 124, incorporates many features not available on typical prior art portable telecommunications test instruments. Integrating all of the features of the present invention caused special problems that had to be solved to make the instrument 100 work properly. In addition, the test instrument 100 has unique features and circuit design.

The instrument 100 has a pair of Tip and Ring test leads 114 and 116, respectively, for electrical connection of the instrument to a pair of wires 14 and 16 (when active with telephone signals the pair of wires are sometimes referred to herein as a telephone line and the wires as a Tip wire 14 and a Ring wire 16). For situations where the pair of wires 14 and 16 have a modular phone jack (not shown) attached thereto, the instrument 100 has a modular plug 118 connected in parallel with the test leads 114 and 116.

The instrument 100 also includes a series of switches 126a–h mounted on a front panel 127 thereof, as shown in FIG. 1, to select the various features of the instrument. All of the features have an alternate mode, which is selected by depressing the desired feature switch and holding it in the depressed position for approximately one second. For example, in the continuity mode, the CONT switch 126d may be depressed and held to enable a signal latching feature for the continuity circuit activated by the switch. The continuity circuit is described in greater detail below. Many features also have an extended mode that is enabled by depressing the OFF switch 126a, and holding it in the depressed position while depressing another one of the other feature switches 126b–h. For example, depressing the OFF switch 126a and the SOLID switch 126b simultaneously will enable a self-test feature of the test instrument 100.

When a feature is selected, a speaker 131 (see FIG. 2), mounted within the case 124, provides auditory cues to inform the technician that a switch entry was recognized by the instrument 100. The instrument 100 also gives a visual indication as to which feature was selected by periodically pulsing one of the lights of a visual display 112 that corresponds to the selected features. The visual display 112 is comprised of a series of LEDs 112a–g which are used to indicate the selected feature. The LEDs 112a–g also are used to provide a visual display of the resistance value measured by the resistance measurement circuit that will be described below.

A status display 128 indicates the condition of the instrument battery and the status of the telephone line to which the instrument 100 is connected. The status display 128 is comprised of LEDs 128a–d. The LED 128a is a low battery indicator and the remaining status display LEDs 128b–d indicate the status of the telephone line (i.e., the pair of wires 14 and 16).

A telephone line generally consists of two wires, called "Tip" and "Ring" by industry convention. By convention, all signals are referenced to the Tip wire. Each status condition of a telephone line is represented by a different voltage range. An "On-Hook" condition is characterized by a voltage, present on the Ring wire 16 with respect to Tip wire 14, ranging from −28 VDC to −50 VDC. An "Off-Hook" condition is characterized by a voltage ranging from −7 VDC to −12 VDC. It is possible that the connection of the Tip and Ring wires 14 and 16 to the telephone system may be accidentally reversed. This status is indicated by the polarity indications of the status display LEDs 128b and 128c of the instrument 100. These two LEDs are bipolar, lighting green or red depending on the polarity of the voltage applied to them. If the voltage on Tip and Ring wires 14 and 16 has the correct polarity, the LED 128b or 128c will light green. If the Tip and Ring wires are reversed, the LED 128b or 128c will light red to indicate that the polarity is reversed.

The ringing voltage for a typical telephone system is an AC signal on the Tip and Ring wires 14 and 16 ranges from 80 to 130 Volts peak-to-peak. The instrument 100 continuously monitors the status of the telephone line (i.e., the pair of wires 14 and 16 to which test leads 114 and 116 are connected), even when the instrument is in the off mode.

Also contained within the case 124 is a tone generator 110 (see FIG. 2), which is used in a variety of circuits of the instrument 100. For example, in a toner mode, selected by depressing the SOLID switch 126b, the tone generator 110 generates a steady tone that is coupled to the test leads 114 and 116 as well as the modular plug 118.

Figure 2:
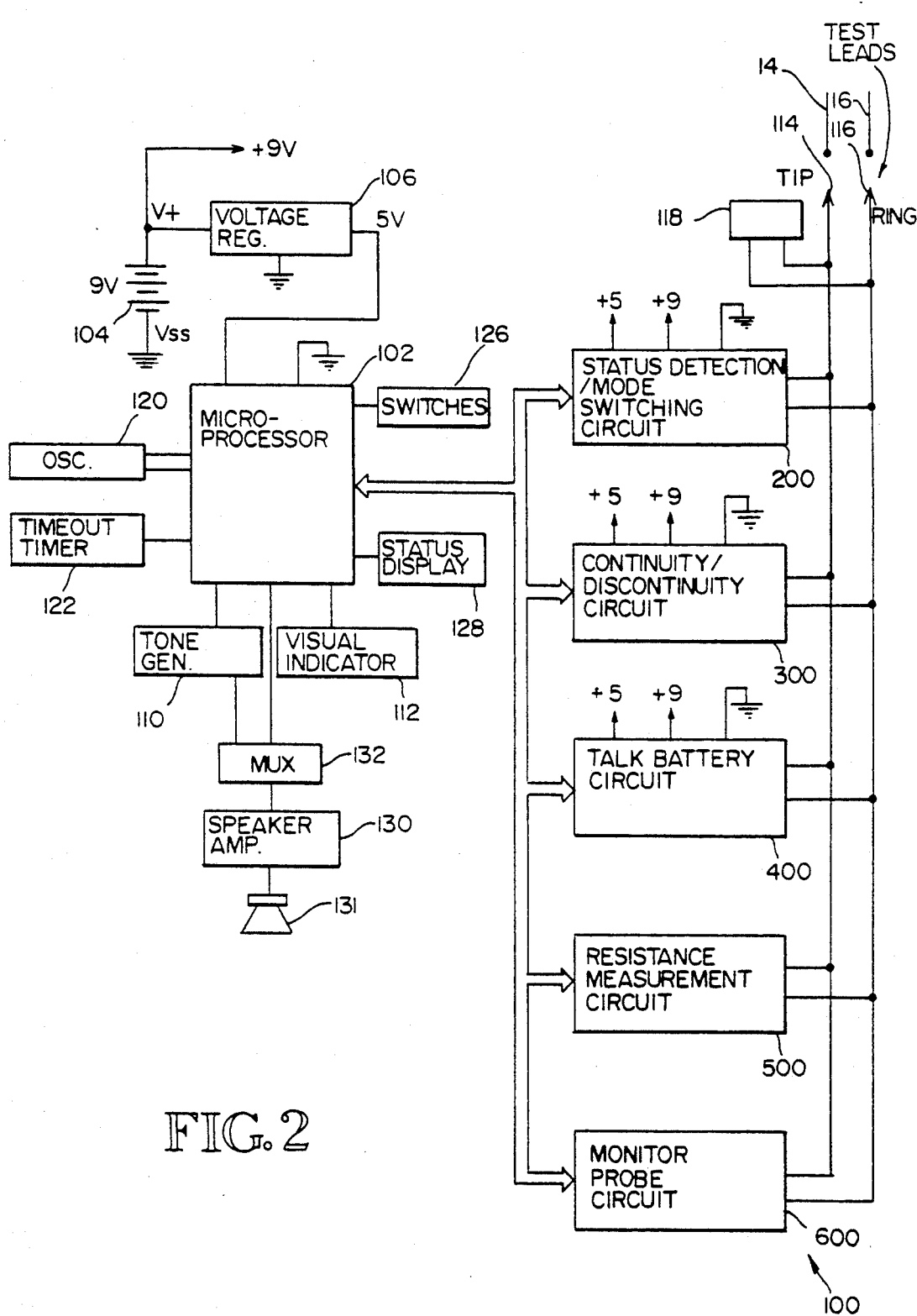
FIG. 2 is a block diagram of the circuitry of the instrument of FIG. 1.

As shown in FIG. 2, the speaker 131 is mounted behind a matrix of holes 129 in the front panel 127 (see FIG. 1), and the speaker is powered by a speaker amplifier 130. A microprocessor 102 selects various signals as inputs to the speaker amplifier 130 through an analog switch multiplexor 132.

The circuits within the instrument 100 are controlled by the microprocessor 102 which contains both random access memory (RAM) and read-only memory (ROM) within a single conventional integrated circuit chip. In addition to the on-chip memory, the microprocessor 102 contains several internal counters and parallel I/O ports through which the instrument 100 is controlled.

The instrument 100 is powered by a 9 volt battery 104 contained within the case 124 to provide power to the instrument 100. The battery 104 provides an unregulated supply voltage (V+) to much of the circuit external of the microprocessor 102. The voltage of the battery 104 is also regulated by a voltage regulator 106 to provide +5 volts to the microprocessor 102 and some external digital logic. The microprocessor 102 has an oscillator 120 connected thereto to provide a time base. Various I/O lines are connected between the microprocessor 102 and the external circuits. The I/O lines are used both for control of the external circuits and to provide status information to the microprocessor. The microprocessor 102 also has an interrupt line that is used by several of the external circuits.

The instrument 100 has many features found separately in typical, handheld telecommunications test instruments. A number of these features have unique designs, as will be described in detail below. However, the instrument 100 also incorporates features not found together in a single prior art test instrument. Integrating all of the features into a single case presented many problems which required a careful design of the entire instrument 100, as will be described.

The instrument 100 includes a line condition monitor circuit 200 which continuously monitors the status of the pair of wires 14 and 16 to determine whether the wires are connected to an active telephone system. The line condition monitor circuit 200 indicates whether the telephone line is in the On-Hook or Off-Hook condition and also monitors and indicates the polarity of the line. The instrument 100 provides visual and audible indications of the line status, and automatically switches modes when voltages harmful to the instrument are present on the telephone line. If the voltage on the telephone line (i.e., wires 14 and 16) exceeds certain limits, damage to the instrument 100 could result. The instrument 100 automatically terminates any mode it may be operating in if the voltage is large enough to harm the instrument. Generally, the instrument 100 is designed to be protected from voltages exceeding 300 volts DC.

The instrument 100 also incorporates a continuity/-discontinuity circuit 300. This feature is useful with phone systems to detect a short circuit or an open circuit on the wires 14 and 16. The same feature is useful in other systems, such as security systems or fire alarm systems, where detecting a short circuit or an open circuit in a string of sensor elements is useful. A typical prior art test instrument cannot detect short duration shorts or breaks in a wire. The continuity/discontinuity circuit 300 of the present invention can measure transients as short as 50 microseconds in duration, and has a latching feature to aid the technician if it is necessary to leave the test instrument connected to a pair of wires at one location while he goes to a remote location along the wires to continue his work. The continuity/discontinuity circuit is also designed for use with alarm systems that incorporate an end of line (EOL) terminating resistor at the end of the wires that are connected to multiple alarm detector elements. A typical prior art test instrument cannot compensate for EOL resistors in performing a continuity/discontinuity function. The continuity/discontinuity circuit 300 of the present invention has alternate thresholds that accommodate different alarm detector configurations and compensates for the standard range of EOL resistance values.

The instrument 100 also includes a talk battery circuit 400 that can be used at a remote job site to provide power for up to four portable telephone sets. Many prior art portable telecommunications test instruments operating off a 9 volt battery have a talk battery mode which provides limited power for communications between telephone sets attached to a pair of wires. These test instruments usually provide enough power for a maximum of only two telephone sets connected in series. The impedance mismatch between telephone sets connected in series results in a weak signal. If the telephone sets are connected in parallel, the impedance is more closely matched, but the power is still limited with prior art test instruments. The instrument 100 of the present invention can power up to four telephone sets in either a series or parallel configuration with a minimum of signal loss.

The instrument 100 further includes a resistance measurement circuit 500 that can perform a fast, accurate measurement of resistance. Resistance measurement circuits are available on every digital multimeter (DMM). While every DMM can measure resistance, none can perform the measurement as quickly as the present invention. The resistance measurement of the present invention can accurately measure resistances up to 1 megohm in approximately 250 milliseconds. A resistance of 1 megohm is important in the telephone industry because it is the typical resistance that is measured when telephone wires show signal leakage due to water inside the wire insulation or corrosion at terminals.

Finally, the present invention has a monitor probe circuit 600 in which one of the pair of test leads 114 and 116 is used as an inductive input. Inductive monitor probes are used in the telephone industry to trace wires that are inside a wall or buried underground, and are used to identify particular individual wires within a bundle of wires. With typical prior art test instruments, a toner device is connected to a pair of wires to generate an AC voltage on the wires as a tone signal. A monitor probe detects the tone signal and, thus, helps the technician locate the wires that carry the tone signal. The input impedance of a monitor probe is very high, and the gain is also high. The great sensitivity of such monitor probes has previously made it impossible to incorporate a monitor probe feature into an integrated test instrument which includes a toner and other features.

Frequently, two technicians will work together and at various times each will use a toner to supply the tone signal and at other times each will use a monitor probe to detect the tone signal supplied by the other technician. The result is that both technicians usually carry two different instruments, a monitor probe and a toner. The instrument 100 of the present invention is specially designed to include both a monitor probe feature and a toner feature, along with the other features previously discussed. The incorporation of the monitor probe feature required the redesigning of every other circuit in the instrument because the great sensitivity of the monitor probe made it susceptible to interference from all other circuits.

The various circuits, which are described in detail below, are all mounted on a single circuit board packaged within the case 124 of the instrument 100 and the case is sized to be easily held in a single hand of the technician. The instrument 100 is controlled by the microprocessor 102 and powered by a single 9 volt battery 104. The microprocessor 102 is designed for low power applications and has a stop mode in which quiescent current drain is only 10 microamps. When the test instrument 100 is unused for a period of time (the period varies depending on the mode selection), the instrument will enter a sleep mode in which much of the circuitry external to the microprocessor 102 is powered down and the microprocessor is placed in a stop mode to conserve battery power. The interrupt line on the microprocessor is always active, even in the stop mode. External circuitry that can generate an interrupt, such as line condition monitors, short circuit detection, and mode selection switches are also continuously powered. If any of these circuits generates an interrupt, the microprocessor 102 comes alive and processes the interrupt before going back into the stop mode. The interrupt circuitry will be discussed in greater detail below.

LINE CONDITION MONITOR WITH AUTOMATIC MODE SWITCHING

Figure 3:
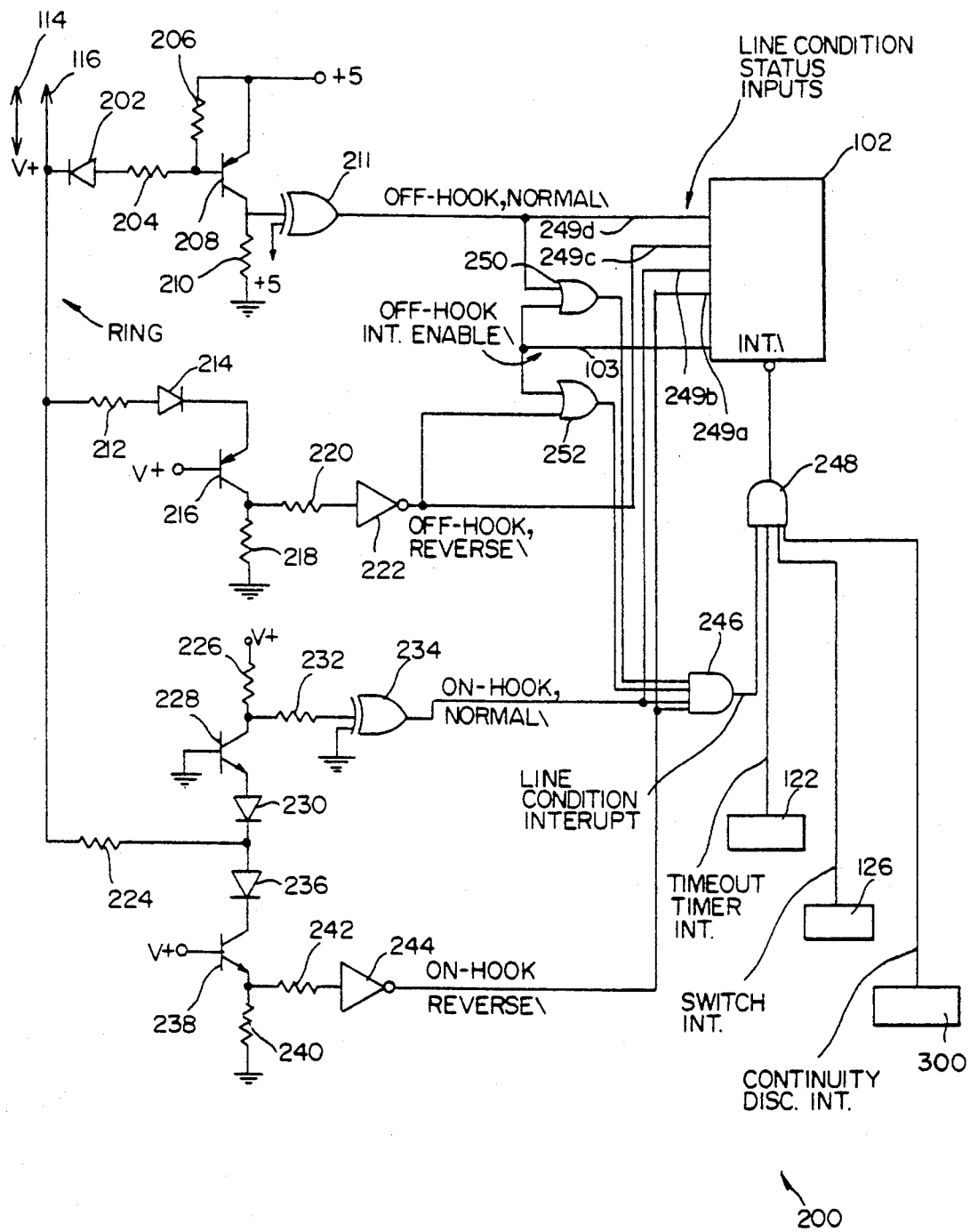
FIG. 3 is a schematic diagram of the line condition monitor circuit of the present invention.

As shown in FIG. 3, the line condition monitor circuit 200 used in the instrument 100 of the present invention continuously monitors the status of the pair of wires 14 and 16 to which the instrument is connected. This is true even when the instrument 100 is placed in the off mode by depressing the OFF switch 126a of the instrument (shown in FIG. 1), or when the instrument enters the sleep mode, as will be described below. When the instrument 100 is placed in the off mode, the microprocessor 102 enters a stop mode, which halts execution of the program used by the microprocessor and shuts down the oscillator 120 (see FIG. 2) in order to conserve power from the battery 104. The current drain of the microprocessor 102 is only 10 microamps in the stop mode as compared with 1-2 milliamps in the normal operating mode.

Portions of the external circuitry continues to operate, even when the microprocessor 102 is in the stop mode. When certain external events occur, the external circuitry generates an interrupt to the microprocessor 102. In response, the microprocessor 102 "wakes up", restarts the oscillator 120, and executes an interrupt routine that determines the source of the interrup. There are several sources that may generate an interrupt.

First, a ten-second timer 122 generates an interrupt every ten seconds in all modes except the tone generation mode. Second, the front panel switches 126a–h generate an interrupt signal whenever the technician depresses one of these switches. A third source of interrupt is the continuity/discontinuity circuit 300. Fourth, the line condition monitor circuit 200 generates an interrupt during most operations of the instrument.

When an interrupt is generated by the ten-second timer 122, the microprocessor 102 increments an internal counter. If the instrument 100 is unused for 90 minutes, it enters the sleep mode to conserve battery power and the microprocessor 102 enters the stop mode, described above. In the sleep mode, the instrument 100 also uses the ten-second timer 122 to periodically generate a finder tone, which is a loud beep, to aid in finding the instrument if it has been misplaced by the technician.

The switches 126a–h are the second source of interrupts to the microprocessor 102. Whenever one of these switches 12a–h is depressed, an interrupt is generated, and in response, the microprocessor 102 will scan the switches to determine which switch was depressed. The microprocessor 102 takes different actions, such as activating a particular portion of the circuitry, depending on which switch was depressed.

The continuity/discontinuity circuit 300 generates an interrupt when the resistance of an external network crosses a preselected threshold.

The line condition monitor circuit 200 is the fourth source of interrupts to the microprocessor 102. The line condition monitor circuit continuously monitors the status of the pair of wires 14 and 16 to which the instrument is connected. The line condition monitor circuit is always active, even when the instrument 100 is turned off by the technician depressing the OFF switch 126a. Whenever the test leads 114 and 116 are connected to the pair of wires, the instrument of the present invention will monitor the line voltage status of the wires to determine if they constitute an active telephone line.

Still referring to FIG. 3, monitoring for the presence of the On-Hook and Off-Hook signals is handled by two different portions of the line condition monitor circuit 200. Similarly, each polarity condition is handled by different portions. Thus, the line condition monitor circuit 200 includes four interdependent circuits designed to handle the various line conditions.

The Tip and Ring test leads 114 and 116 are connected to the Tip and Ring lines, respectively, of a telephone system (i.e., the pair of wires 14 and 16). The test lead 116 is connected internally to the cathode of a diode 202, and to the resistors 212 and 224, which are the inputs to the line condition monitor circuit 200. The test lead 114 is connected internally to the supply voltage V+. If there is no voltage present on the pair of wires 114 and 116 to which the instrument 100 is connected, no interrupt will be generated.

If the telephone lines carry an On-Hook signal and are properly wired, there will be a voltage on resistor 224 more negative than −20 volts DC. This causes current to flow through a network formed by resistor 226, transistor 228, diode 230 and resistor 224. The voltage on the collector of transistor 228 is then pulled low. The collector of transistor 228 is also tied to a logic gate 234 through current limiting resistor 232. Thus, the signal on the input to the logic gate 234 is pulled low (an On-Hook normal polarity condition).

Logic gate 234 passes the logic signal without inverting it. The low signal from the output of logic gate 234 is both a status input to the microprocessor 102 and a source of interrupt through a pair of logic gates 246 and 248. The low level output logic signal of the logic gate 234 is applied to the input of logic gate 246 and causes the output of logic gate 246 to go low. In identical fashion, the low level output signal of the logic gate 246 is applied to the input of logic gate 248 and causes the output of logic gate 248 to go low and generate an interrupt signal to the microprocessor 102.

In response to the interrupt, the microprocessor 102 scans four status lines 249a–d, which are inputs to the microprocessor 102 and will be described below, and lights the LED 128b of the status display 128 green to indicate an On-Hook condition with normal polarity. The microprocessor 102 also causes the tone generator 110 to generate a short duration (1 second) warble tone over the speaker 128 to audibly indicate to the technician that an On-Hook condition exists.

If the polarity of the Tip and Ring lines are reversed, there will be a positive voltage, more positive than +20 volts DC, on resistor 224. This causes current to flow through a network formed by resistor 240, transistor 238, diode 236 and resistor 224. The voltage on the collector of transistor 238 is then pulled sufficiently high to activate a logic inverter 244 connected thereto through a current limiting resistor 242 (an On-Hook reverse polarity condition). The output of logic inverter 244 is provided to one of the status lines 249a to the microprocessor 102 and generates an interrupt signal to the microprocessor 102 through logic gates 246 and 248, as described above. Much as described above for the On-Hook condition with normal polarity, the microprocessor 102 lights the LED 128b of the status display 128 except in an On-Hook condition with reverse polarity (which lights LED 128b red), and also generates the identical warble tone described above.

The Off-Hook signal is characterized by a voltage ranging from −7 to −12 volts DC. If the telephone lines are properly wired, a negative voltage will appear on the diode 202. A negative voltage more negative than −5 volts DC on diode 202 allows current to flow through a resistor 204 connected to the base of a transistor 208, which causes transistor 208 to turn on. When transistor 208 turns on, a positive voltage develops across a resistor 210 connected between the collector of the transistor and ground. This positive voltage is supplied to a logic gate 211 and is sufficient to activate the logic gate 211. Since the other input to logic gate 211 is tied to a high logic level, the logic gate 211 acts as an inverter. Thus, the output of logic gate 211 will go low (an Off-Hook normal polarity condition). The output of logic gate 211 is provided to one of the status lines 249d to the microprocessor 102 and generates an interrupt signal to the microprocessor through a logic gate 256 which is connected to the series logic gates 246 and 248 described above. The microprocessor 102 responds to the interrupt by lighting the LED 128c of the status display 128 green to indicate an Off-Hook condition with normal polarity. The tone generator 110 also generates a brief (1 second) steady tone to indicate to the technician that Off-Hook condition exists.

If the Tip and Ring lines are reversed, there will be a voltage more positive than +5 volts DC on the resistor 212. The positive voltage on resistor 212 causes current to flow through a network formed by resistor 218, transistor 216, diode 214 and resistor 212. The voltage on the collector of transistor 216 is then pulled sufficiently high to activate a logic inverter 222 connected thereto through a current limiting resistor 220 (an Off-Hook reverse polarity condition). The output of logic inverter 222 is provided to one of the status lines 249c to the microprocessor 102 and generates an interrupt signal to the microprocessor 102 through a logic gate 252 which is connected to the series logic gates 246 and 248 described above. The microprocessor responds to the interrupt by lighting the LED 128b of the status display 128 red to indicate an Off-Hook condition with reverse polarity, and generates a brief (1 second) steady tone to give an indication to the technician that an Off-Hook condition exists.

When the instrument 100 is in the tone generator mode (as a result of depressing either SOLID or ALT keys 126c), the tone generator 110 creates a squarewave with an amplitude approximately 8 volts peak-to-peak (switching from 0 volts to −8 volts). This tone signal is within the range of voltages that is detected by the line condition monitor circuit 200 described above and could be sensed as being an Off-Hook signal. Normally, the line condition monitor circuit 200 generates an interrupt every time a tone is generated. To avoid this unwanted interrupt condition, the instrument 100 has an interrupt enable for the Off-Hook detection circuitry just described (both normal and reverse polarity). The interrupt signals from the Off-Hook normal polarity and Off-Hook reverse polarity logic gates 211 and 222, respectively, go through additional logic gates 250 and 252, respectively, before becoming inputs to logic gate 246. The output of logic gate 211 is provided as an input to the logic gate 250. An interrupt enable line 103 of the microprocessor 102, which is low when active, is the other input to logic gate 250. Whenever this interrupt line is enabled (i.e., logic low), the output of logic gate 250 follows the logic level for Off-Hook normal on the status line 249d. When that status line 249d is high, the output of logic gate 250 will be high. If the status line 249d goes low, the output of logic gate 250 goes low and generates an interrupt through logic gates 246 and 248 as described above. However, if the microprocessor 102 is in the tone-generating mode (as a result of depressing either SOLID or ALT keys 126b or 126c), the microprocessor sets the interrupt enable line 103 to a high logic level. A high logic level on the input of logic gate 250 will force the output of logic gate 250 to always remain high, even though the line condition circuit 200 detects an Off-Hook normal signal on the pair of wires 14 and 16 every time a tone is generated. Thus, the interrupts are disabled in the tone generating mode.

Similarly, the Off-Hook reverse polarity interrupt is disabled when the interrupt enable line 103 is set to a high logic level by the microprocessor 102. The interrupt enable line is an input to the logic gate 252, as is the Off-Hook reverse polarity status line 249c. This interrupt enable circuit operates in the manner described above.

The ring voltage, which ranges from 80 to 100 volts AC p-p, exceeds the voltage detection levels for the On-Hook signal. The microprocessor 102 will receive alternating interrupts from the On-Hook normal polarity and On-Hook reverse polarity circuitry described above. The microprocessor 102 interprets this activity as a ringing signal and lights the LED 128d on the status display 128 to indicate an AC condition, and generates an audible tone for the duration of the AC condition to give an indication to the technician that an AC condition exists.

Whenever a telecommunications test instrument is in a mode other than the line condition monitor mode, the instrument does not expect the pair of wires 14 and 16 to be active (i.e., to have a voltage on them). Prior art instruments have crude voltage detector circuits to indicate that wires are active. If the voltages on the wires 14 and 16 are sufficiently large, the prior art instrument may be damaged. In the instrument 100 of the present invention, the line condition monitor circuit 200 gives both visible and audible indications of the line condition to alert the technician that the telephone line is active.

In addition to providing an alert indication to the technician, the instrument 100 automatically switches from the selected mode to the off mode in order to protect the instrument from damage. The instrument will not switch modes when the monitor mode has been selected. When the microprocessor 102 detects an abnormal condition in a mode other than monitor mode, the microprocessor shuts off the circuitry of the selected mode and enters the off mode. The instrument 100 is thereby protected from possible damaging voltages on the telephone line.

CONTINUITY/DISCONTINUITY CIRCUIT

Figure 4:
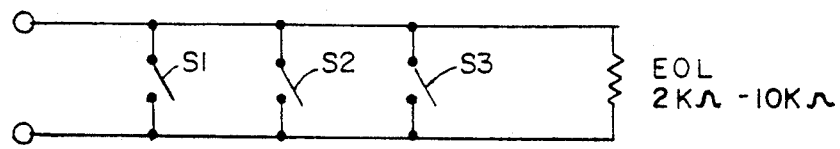
FIG. 4 shows a conventional multiple sensor system in a parallel configuration.

Checking the continuity or discontinuity of a circuit is used in the telephone industry, but is also important for checking fire alarm systems and security alarm systems which have many detectors or sensors used on a single pair of wires. Some systems, such as fire alarm systems, use multiple sensors S1–S3 in a parallel configuration, as shown in FIG. 4, in which multiple sensors are connected in parallel across a pair of wires. These sensors are in the normally open position shown, and close when activated by a fire or a malfunction to cause a continuity in the parallel circuit.

Figure 5:
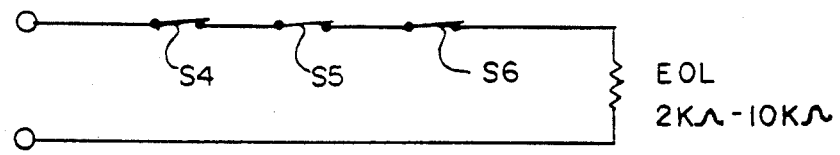
FIG. 5 shows a conventional multiple sensor system in a series configuration.

Other systems, such as security systems, use multiple sensors S4–S6 in a series configuration, as shown in FIG. 5, with all of the sensors being shown in the normally closed position. When a sensor is activated or malfunctions, the sensor opens up, causing a discontinuity in the series circuit.

Both fire and security alarm systems typically use a terminating or "end of line" resistor EOL to facilitate to checking the system to be certain that the circuit is intact. Typical EOL resistors in a multiple sensor system range from 2000 ohms to 10,000 ohms. Existing continuity/discontinuity test instruments cannot automatically make accurate continuity and discontinuity determinations when EOL resistors are in use. Therefore, a technician must perform the often difficult or time-consuming task of disconnecting or shorting the EOL resistor before testing the system.

With the instrument 100 of the present invention, the continuity/discontinuity circuit 300 is capable of performing continuity and discontinuity tests on both parallel and series circuit configurations without requiring the removal of the EOL resistor. When testing a series circuit configuration in the continuity mode, the continuity/discontinuity circuit 300 interprets a circuit resistance that is less than the sum of the resistance of the wires (approximately 300 ohms) and the maximum normal EOL resistance (10,000 ohms) as being a short circuit, (i.e., a continuity condition). However, a continuity test of a parallel circuit configuration interprets a circuit resistance less then the resistance of the wires (approximately 300 ohms) as being a short circuit, (i.e., a continuity condition).

In the discontinuity mode, the range of resistances must be interpreted differently. When testing a series circuit configuration in the discontinuity mode, continuity/discontinuity circuit 300 interprets a circuit resistance that exceeds the sum of the resistance of the wires (approximately 300 ohms) and the maximum normal EOL resistance (10,000 ohms) as being an open circuit, (i.e., a discontinuity condition). When testing a parallel circuit configuration, the continuity/discontinuity circuit 300 interprets a circuit resistance value that exceeds the minimum normal EOL resistance (1900 ohms) as being an open circuit, (i.e., a discontinuity condition).

The technician selects the continuity mode by depressing CONT switch 126d (see FIG. 1) and can select an alternate mode for parallel alarm systems by holding the OFF switch 126a in the depressed position and then depressing the CONT switch. Similarly, the discontinuity mode is selected by depressing DISC switch 126e, and the alternate mode for parallel alarm systems is selected by holding the OFF switch in the depressed position and then depressing the DISC switch. The instrument 100 has a memory function that will remember whether the technician last selected the primary or alternate threshold. As such, when the continuity or discontinuity mode is selected by depressing either the CONT or DISC switch 126d or 126e, the instrument 100 will automatically select the threshold that was last selected. This avoids the user repeatedly having to select the threshold desired when repeatedly testing either series or parallel circuit configurations.

Figure 7:
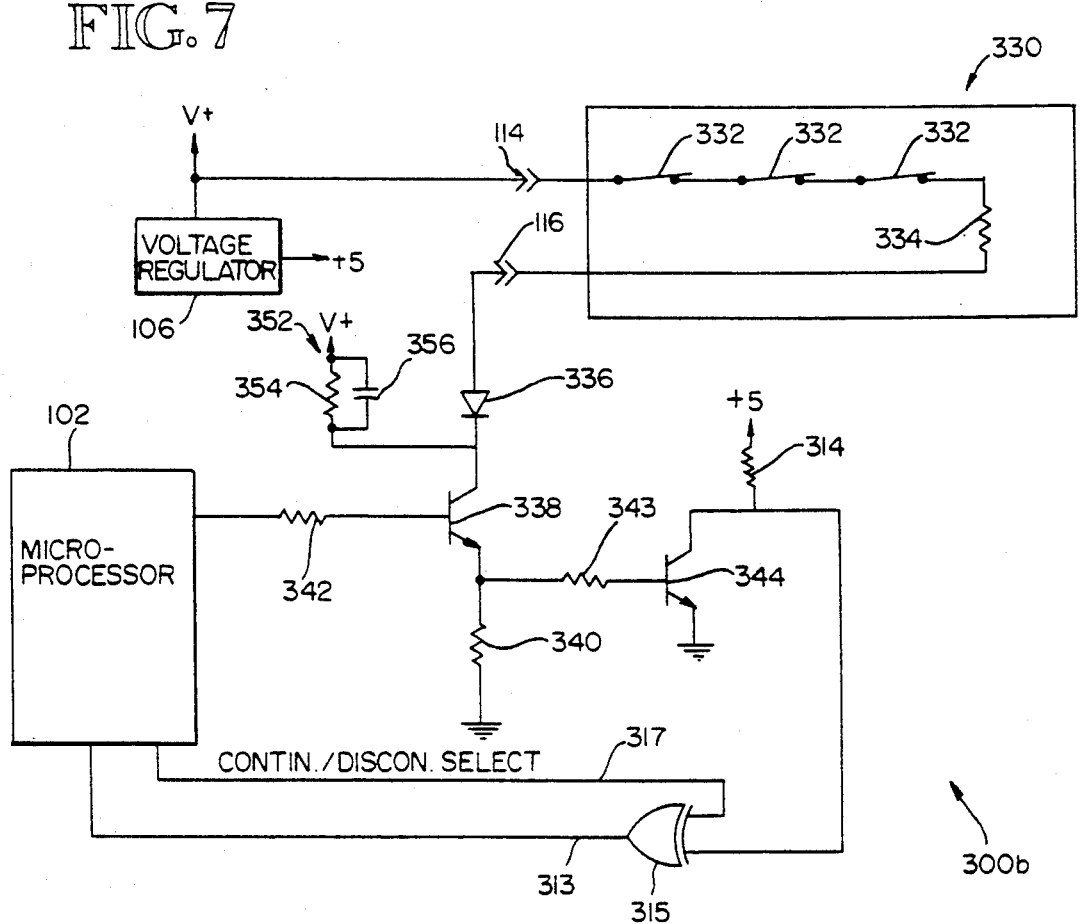
FIG. 7 is a schematic diagram of the continuity/discontinuity circuit of the present invention for use with multiple sensors in a series configuration.

There are two alternate modes for the continuity and discontinuity circuit 300. The alternate modes select different thresholds that the instrument will consider a short circuit (i.e., a continuity) and an open circuit (i.e., a discontinuity). The primary mode checks for continuity or discontinuity in the series circuit configuration as shown in FIG. 7 for many security alarm systems. In the primary mode, any resistance less than or equal to 100,000 ohms between the leads 114 and 116, will be interpreted as a continuity by the circuit 300A. The circuit 300A thereby compensates for the EOL resistor by setting the detection threshold at 100,000 ohms. If any one of the series sensors is open, the resistance of the alarm system will be infinite. Thus, a short (i.e., a continuity) is any resistance less than 100,000 ohms while an open circuit (i.e., a discontinuity) is greater than 100,000 ohms.

Figure 6:
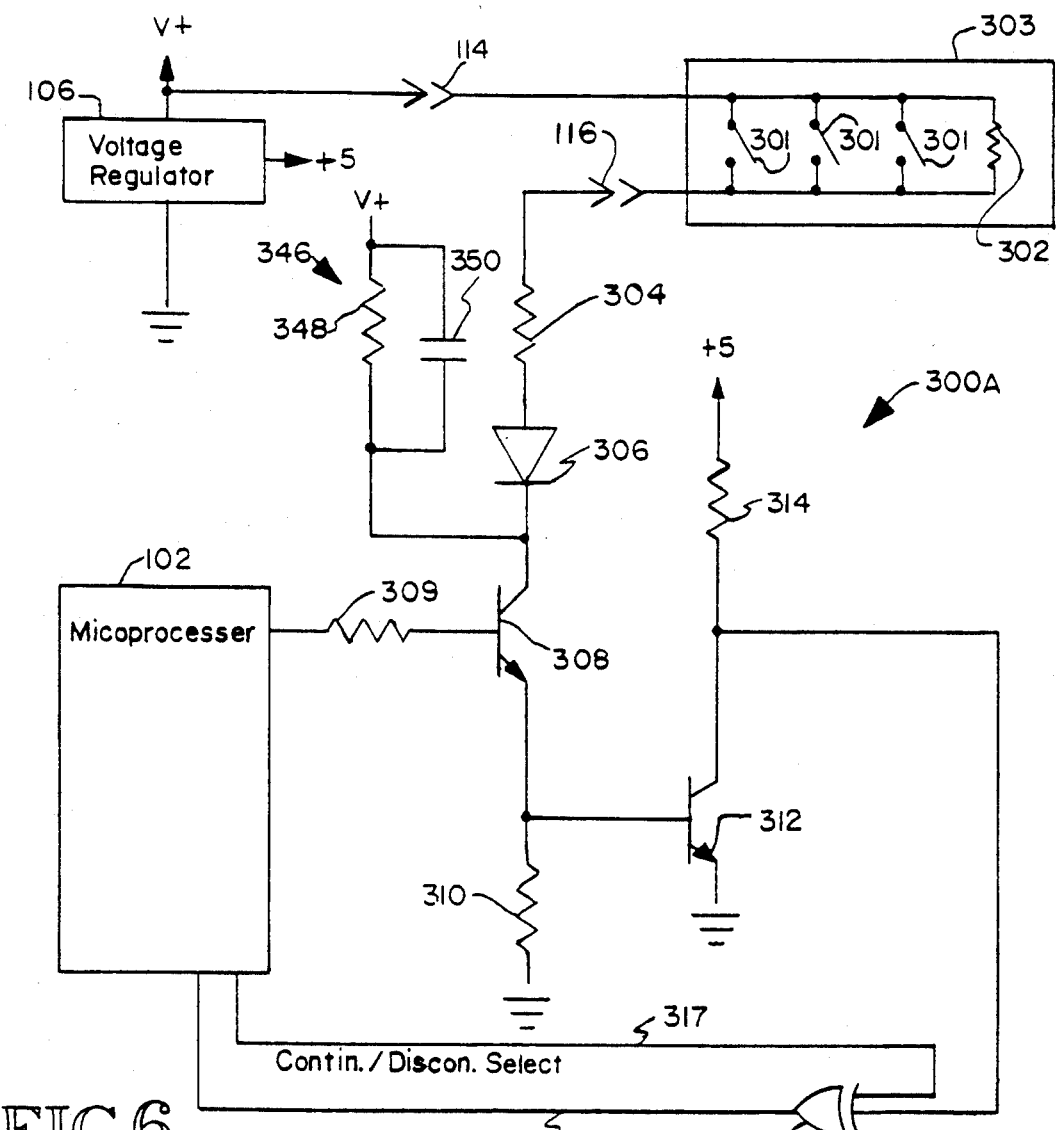
FIG. 6 is a schematic diagram of the continuity/discontinuity circuit of the present invention for use with multiple sensors in a parallel configuration.

The alternate mode is applicable to the parallel circuit configuration of many fire alarm systems, as shown in FIG. 6. In the alternate mode, the thresholds are lower to allow for the difference in configuration. If any one of the parallel sensors is closed, the resistance of the alarm system will be less than 300 ohms (the resistance of the wires in the alarm system). Thus, the circuit 300B will interpret any resistance between the leads 114 and 116 that is less than approximately 1000 ohms will be interpreted as a short circuit (i.e., a continuity), while a resistance greater than 1000 ohms will be considered an open circuit (i.e., a discontinuity).

When the threshold corresponding to the parallel configuration is selected for either the continuity or discontinuity mode, the instrument 100 utilizes the circuit 300A shown in FIG. 6. The microprocessor 102 turns on a transistor 308 through a current-limiting resistor 309, which allows current to flow from the power supply V+ through the test lead 114 and into an alarm system 303 to be tested, which system is comprised of multiple normally open sensors 301 and an EOL resistor 302. Current returns to the circuit 300A through test lead 116 and flows through a current limiting resistor 304, a diode 306, the transistor 308 and a resistor 310. Resistor 310 is included in the circuit 300A so that current flowing through the resistor 310 will cause a voltage to build up on the base of a transistor 312. Transistor 312 is a switching transistor that is normally turned off, so that the collector of transistor 312 is pulled to +5 volts through a current limiting resistor 314. As the current flow through resistor 310 increases, the voltage on the base of transistor 312 will increase until transistor 312 switches on and generates an interrupt to the microprocessor 102 on line 313. The value of resistor 310 is chosen so that transistor 312 will turn on when the resistance value of the tested alarm system is approximately 1,000 ohms.

In the present embodiment of the invention, resistor 304 is 680 ohms, diode 306 is a 1N4005 diode with a high reverse voltage rating, transistor 308 is a high voltage, low leakage switching transistor. The high voltage ratings of diode 306 and transistor 308 protect the instrument 100 from damage in the event that high voltages are applied to the instrument through the test leads 114 and 116. The low leakage characteristic of transistor 308 is important to allow the monitor probe circuit 600 to function within the instrument 100. Any current that may leak through transistor 308 is snubbed to the test lead 114 by a snubber circuit 346. The actual operation of the snubber circuit 346 will be described below with the monitor probe circuit 600.

The resistor 310 has a value of 130 ohms which requires approximately 5 milliamps of current through the resistor 310 to create sufficient voltage to turn on transistor 312. When the continuity/discontinuity circuit is activated through the switches 126d or 126e, transistor 308 is saturated and has a voltage of approximately 0.5 volts from collector to emitter and diode 306 has a forward voltage drop of approximately 0.7 volts. When the resistance of the alarm system being tested is 1,000 ohms or less, transistor 312 will turn on and pull the input to logic gate 315 low. The other input to logic gate 315 is the polarity select line 317 from the microprocessor 102. If the continuity mode was selected by the technician, polarity select line 317 will be low. When transistor 312 turns on (indicating a continuity), the output of logic gate 315 goes low and generates an interrupt to the microprocessor 102 on line 313. If the discontinuity mode were selected by the technician, the polarity select line 317 would be high, causing logic gate 315 to act as an inverter. Thus, an interrupt to the microprocessor 102 will be generated on line 313 whenever transistor 312 turns off (indicating a discontinuity).

The trigger threshold of circuit 300A is set for approximately 1,000 ohms for use with a parallel circuit configuration. If any one of the sensors 301 should close or another short exist, the resistance sensed by circuit 300A would be approximately 300 ohms (the resistance of the wires) or less, which is less than the threshold. Thus, the level on the interrupt line 313 to the microprocessor 102 will be low to indicate that there is a short in the tested alarm system. A high level on this line indicates that the resistance is above 1,000 ohms, which is considered an open circuit.

The theory of operation is essentially the same when the technician selects the threshold corresponding to the series circuit configuration regardless of whether the continuity or discontinuity mode is selected, except the instrument 100 utilizes the circuit 300B shown in FIG. 7. A portion of this circuit is also used by the talk battery circuit 400, discussed below. The circuit 300B is activated when the microprocessor 102 turns on transistor 338, through a current limiting resistor 342, which allows current to flow from the power supply V+ through the test lead 114 and into an alarm system 330 to be tested, which system is comprised of multiple normally closed sensors 332 and an EOL resistor 334. Current returns to the circuit 300B through test lead 116 and flows through a diode 336, the transistor 338, and a resistor 340.

The transistor 338 is a high voltage, low leakage switching transistor. The low leakage characteristic is important to allow the monitor probe circuit 600 to function within the instrument 100. Any that does leak current through transistor 338 is snubbed to the test lead 114 by a snubber circuit 352. The actual operation of snubber circuit 352 will be described below with the monitor probe circuit 600. The high voltage rating of transistor 338 protects the instrument 100 from high voltages that may be applied to the test leads 114 and 116 of the instrument. The transistor is able to withstand voltages exceeding 300 volts from collector to emitter. Diode 336 has a high reverse voltage rating to protect transistor 338 in the event that a reverse polarity high voltage is applied to test leads 114 and 116. The diode 336 will protect the instrument 100 from voltages exceeding 300 volts.

Resistor 340 is included in the circuit 300B so that current flowing through the alarm system 330 will cause a voltage to build up on the base of a transistor 344, through a current limiting resistor 343. Transistor 344 is a switching transistor. With no current flowing through resistor 340, transistor 344 is turned off, and the collector of transistor 344 is pulled to +5 volts through a current limiting resistor 314. Note that the collector of transistor 312 of FIG. 6 and the collector of transistor 344 of FIG. 7 are tied together and are both pulled high through the same current limiting resistor 314. This allows the logic gate 315 and the polarity select line 317 to operate in an identical manner to generate an interrupt in both the continuity and discontinuity modes, and allows the same line 313 to the microprocessor 102 to serve as an indication of the open circuit or short circuit condition of the alarm system being tested. Alternatively, separate lines could be used to perform the status indication.

As current increases through resistor 340, the voltage on the base of transistor 344 increases until transistor 344 switches on. The low level on the collector of transistor 344 indicates to the microprocessor 102 that the resistance of the alarm system 330 is less than the threshold, and that the system has continuity. The detection threshold is governed by the value of resistor 340. In the present embodiment of the invention, resistor 340 is 4,700 ohms. The threshold for the series configuration alarms is set at approximately 100,000 ohms.

Another important feature is the ability to detect transient changes in the continuity or discontinuity of the system being tested. If a sensor momentarily shorts or opens, the system may erroneously activate. A technician needs an instrument that can detect such transient changes and, optionally, latch the transient changes in resistance. The instrument 100 of the present invention can detect transient changes in continuity/discontinuity in approximately 50 microseconds. The continuity/discontinuity circuit 300 detects transient changes in the resistance of the alarm system being tested and generates an interrupt to the microprocessor 102. The microprocessor 102 gives an indication of an open circuit or a short circuit, depending on the mode selected. The microprocessor 102 also is capable of latching the continuity/discontinuity detection signal to aid the technician in finding shorts or breaks in an alarm system if the technician leaves the instrument 100 attached to the wires 14 and 16 and moves to a remote location along the wires to continue work.

TALK BATTERY CIRCUIT

The instrument 100 of the present invention has the capability of powering up to four remote telephone sets that are connected to the pair of wires 14 and 16. For a telephone set to operate, it must have a power source to drive current through the telephone set. When a person speaks into the telephone set, the resistance of its microphone element is altered by the voice and, thus, a voltage corresponding to the voice signal is created. For maximum power transfer between telephone sets, the source resistance should equal the load resistance. Therefore, for maximum power transfer, each telephone set should "see" an impedance that matches the nominal impedance of the telephone set.

Figure 8:
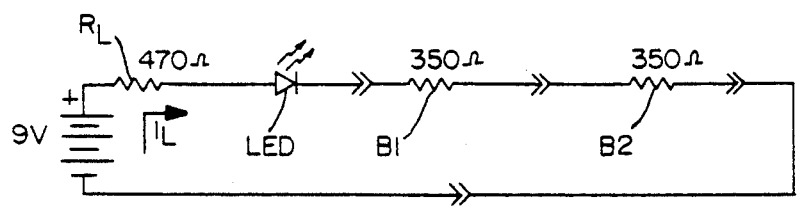
FIG. 8 is a schematic diagram showing a typical prior art talk battery circuit for series connected telephone sets.
Figure 9:
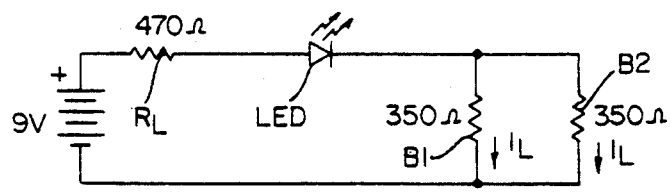
FIG. 9 is a schematic diagram showing a typical prior art talk battery circuit for parallel connected telephone sets.

In remote locations or in areas where no AC power is available, such as in new construction, the test instrument 100 must be capable of providing power for the portable telephone sets, usually known as butt sets, over a pair of installed, but inactive telephone wires. Typical prior art test instruments provide power through a current limiting resistor $R_L$ and a light emitting diode LED, as shown in FIGS. 8 and 9. A typical butt set has a nominal resistance of about 350 ohms, and a typical current limiting resistor $R_L$ has a resistance of 470 ohms.

In FIG. 8, two such butt sets $B_1$ and $B_2$ are connected in series with the pair of wires, resulting in a current flow of approximately 6 milliamps. When used in a series configuration, each butt set is loaded with an impedance of 820 ohms (350 ohms from the other butt set plus the 470 ohm current limiting resistor). The efficiency of power transfer is thus limited in the series circuit configuration.

Alternatively, the butt sets $B_1$ and $B_2$ may be connected in a parallel configuration as shown in FIG. 9. This circuit configuration results in a current flow $I_L$ of approximately 5.4 milliamps through each butt set. This circuit arrangement also optimizes power transfer because each butt set is loaded with an impedance of 200 ohms (350 ohms from the other butt set in parallel with the 470 ohm current limiting resistor), which more closely matches the nominal butt set impedance of 350 ohms. However, the loudness of the telephone signal is directly related to the current flow through the butt set, and neither circuit arrangement provides enough power to effectively run more than two butt sets.

Figure 11:
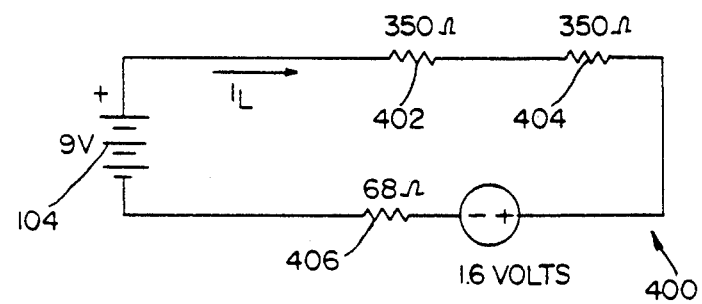
FIG. 11 is a schematic diagram of the equivalent circuit of the circuit of FIG. 10.
Figure 12:
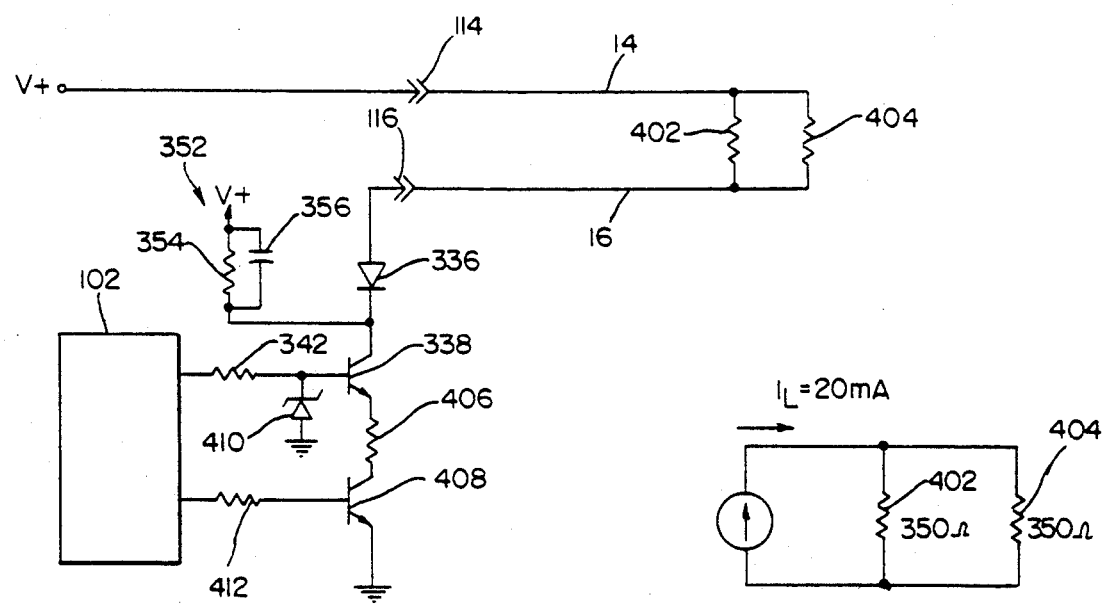
FIG. 12 is a schematic diagram of the talk battery circuit of the present invention with two telephone sets connected in parallel.
Figure 13:
FIG. 13 is a schematic diagram of the equivalent circuit of the circuit of FIG. 12.

The present invention, shown in FIGS. 11 and 12, allows up to four butt sets to be powered by the test instrument. Both the series and parallel configurations may be used. To optimize power transfer to the butt sets, the talk battery circuit 400 operates as a voltage source when the butt sets are connected in series, and the talk battery circuit 400 automatically switches to a current source when the butt sets are connected in parallel.

Since, the instrument 100 is small enough to fit in one hand, and is battery powered, this feature of the instrument is particularly useful in building construction where there is no existing electrical power for technicians to use even though inactive telephone wires are already installed or temporary lines are in existence. If the technician has a portable telephone set, he may communicate with other technicians at locations apart from him within the building. Even without a telephone set, the technician can use the instrument 100 of the present invention to power remote telephone sets and monitor the communications between the remote locations.

As shown in FIG. 1, the instrument 100 is easily connected to the pair of wires 14 and 16 through the test leads 114 and 116 or through the modular connector 118 if the pair of wires is already connected to a standard modular phone jack. The switch 126f allows the technician to enable the talk battery circuit 400. The instrument 100 provides power to the pair of wires 14 and 16 through the test leads 114 and 116.

Figure 10:
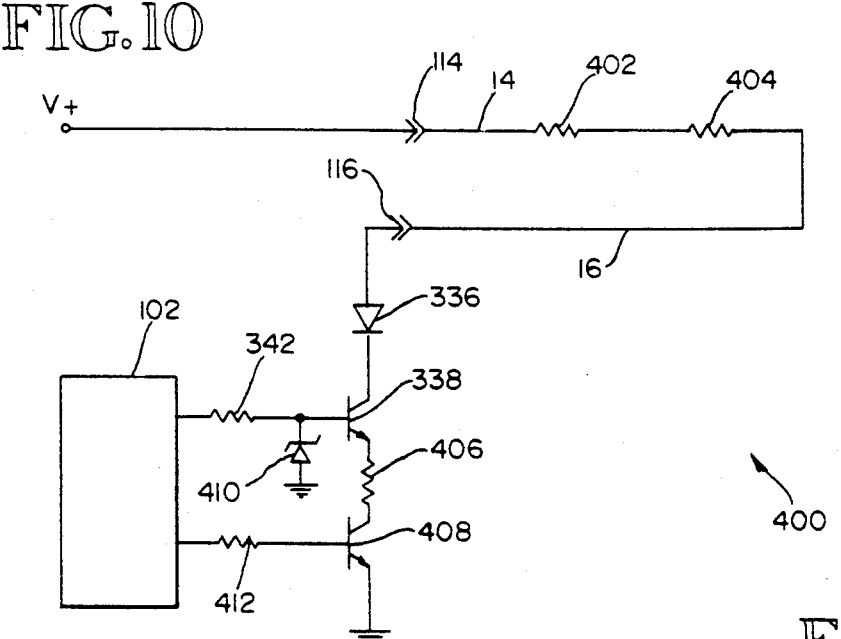
FIG. 10 is a schematic diagram of the talk battery circuit of the present invention with two telephone sets connected in series.

As best shown in FIGS. 10 and 12, the talk battery circuit 400 is powered by the battery 104 providing supply voltage V+, which provides power to up to four remote butt sets through the test leads 114 and 116, two such butt sets 402 and 404 being shown in the drawings. Current flows from test lead 114 through the butt sets 402 and 404. The current returns to the talk battery circuit 400 through test lead 116. The current is conducted through a diode 336, a transistor 338, a current limiting resistor 406, and a transistor 408 before being returned to the battery 104. The diode 336 serves to protect transistors 338 and 408 in the event that dangerous voltages are introduced to the instrument 100 through the test leads 114 and 116, and will protect the instrument from damage even if such voltages exceed 300 volts.

When the butt sets 402 and 404 are connected in series, as shown in FIG. 10, the transistors 338 and 408 are both turned on by the microprocessor 102 through the current limiting resistors 342 and 412. Both transistors are saturated, with a nominal voltage drop of only 0.5 volts across each transistor. The equivalent circuit is shown in FIG. 11, where the current limiting resistor 406 has a value of 68 ohms, and the total voltage drop across the diode 336 (approximately 0.6 volts) and the transistors 338 and 408 (approximately 1.0 volts) is illustrated as being 1.6 volts. The resulting current flow $I_L$ through the butt sets 402 and 404 is approximately 9.6 milliamps. This increased current gives greater volume in the butt sets, and the impedance of the circuit, 418 ohms (350 ohms from the other butt set plus the 68 ohms from the current limiting resistor), more closely approximates the desired 350 ohm impedance of each butt set. Thus, power transfer is more efficient with the present invention than was previously possible.

If four butt sets were connected in series, the resulting current $I_L$ would be reduced to 5 milliamps, with each butt set sensing an impedance of approximately 1118 ohms (from three other butt sets each at 350 ohms plus the 68 ohm current limiting resistor). The current flow in this configuration is comparable to the current flow in prior art instruments which can only operate two butt sets connected in series. Further, the load impedance for each butt set is only slightly higher than the prior art impedance for two butt sets. While the efficiency power transfer may be somewhat reduced, the talk battery circuit 400 of the present invention provides the flexibility of allowing communications with up to four remote telephone sets.

It is noted that when the butt sets 402 and 404 are connected in series as shown in FIG. 10, the current flowing through the current limiting resistor 406 creates a voltage on the emitter of transistor 338 of approximately 1.15 volts. This means that the base of transistor 338 will have a potential of about 1.75 volts, but the voltage on the base of the transistor 338 is not sufficient to cause a clamping diode 410 connected thereto to turn on. Thus, the transistor 338 remains saturated, and operates as a voltage source. Diode 410 may be a Zener diode with a reverse voltage of about 2.4 volts. Alternatively, the diode 410 may comprise a series of diodes with a total forward voltage drop of approximately 2.4 volts.

When the butt sets 402 and 404 are connected in parallel, as shown in FIG. 12, the current flow through the transistors 338 and 408 increases due to the decreased resistance presented by the parallel connected butt sets 402 and 404. The increased current flow through the current limiting resistor 406 causes an increase in the voltage on the emitter of transistor 338, with a corresponding increase of voltage at the base of transistor 338. With the butt sets 402 and 404 connected in parallel, the voltage on the base of transistor 338 reaches approximately 2.4 volts and diode 410 becomes active, clamping the voltage at the base of transistor 338 to about 2.4 volts. At this point, transistor 338 operates as a current source, with a current of approximately 20 milliamps. The voltage from the collector to the emitter of transistor 338 may vary, but the current will remain constant.

In the parallel configuration of FIG. 12, the current flowing through each butt set is approximately 10 milliamps. Thus, the present invention provides greater current and a corresponding increase in loudness than was previously possible for two butt sets. Furthermore, each butt set will have a load impedance of 350 ohms from the other butt set. Because the load impedance matches the source impedance in this configuration, power transfer between the butt sets 402 and 404 is maximized.

If four butt sets are connected in parallel, the current source of the talk battery circuit 400 will still provide 20 milliamps, but the current through each butt set will be reduced to approximately 5 milliamps per butt set. Each butt set will sense a load impedance of approximately 117 ohms. Thus, the talk battery circuit 400 of the present invention provides about the same amount of current to four butt sets in parallel that a typical prior art instrument will provide to only two butt sets, while the impedance mismatch with the circuit of the present invention is still small enough to allow satisfactory operation with four butt sets.

Transistor 338 is chosen for its low leakage characteristic as well as for its high breakdown voltage. The low leakage characteristic is important for the successful operation of the monitor probe circuit 500. The snubber circuit 352 shunts any residual leakage to the Tip test lead 114 in order to prevent leakage through transistor 338 to $V_{ss}$. More detailed explanation of the operation of the snubber circuit 352 will be provided in the monitor probe discussion below.

The instrument 100 also monitors the status of the pair of wires 14 and 16 to which the instrument is connected as previously discussed. If the line conditon monitor circuit 200 detects voltages on the pair of wires, the microprocessor 102 alerts the technician that the chosen wire pair already has a signal present on the wire pair. Thus, the technician is warned that the chosen wire pair may not be used for the desired communication.

RESISTANCE MEASUREMENT CIRCUIT

Figure 15:
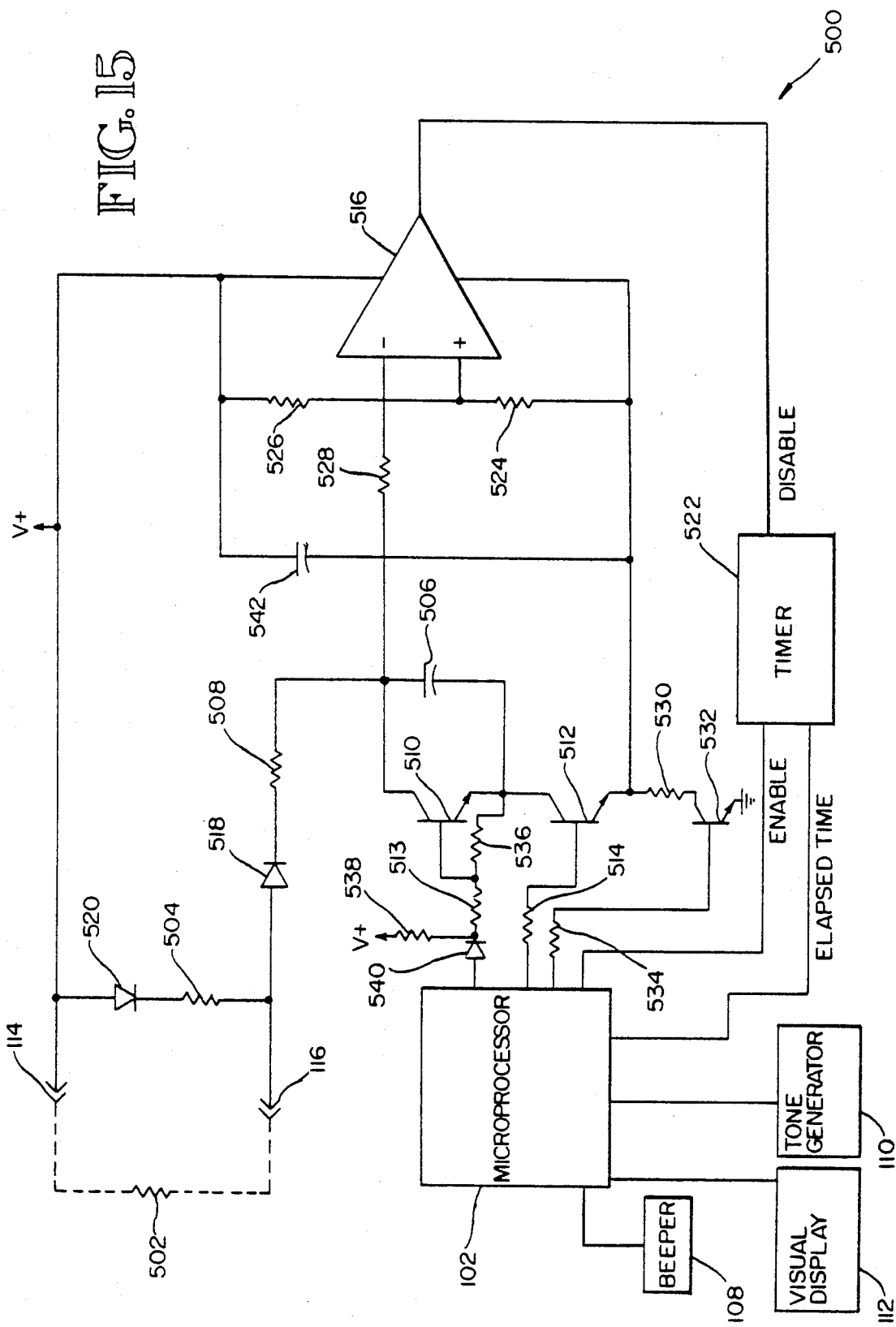
FIG. 15 is a schematic diagram of the resistance measurement circuit of the present invention.
Figure 14:
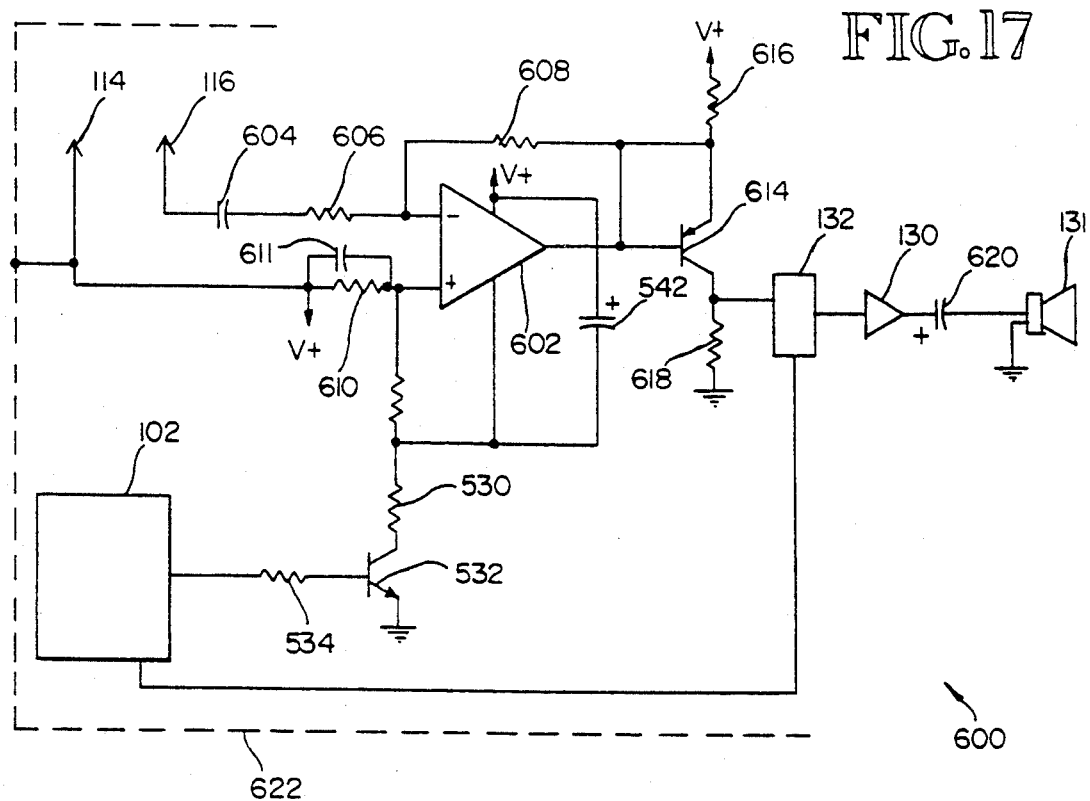
FIG. 14 is a schematic diagram of a typical resistor-capacitor charging circuit.
Figure 14:
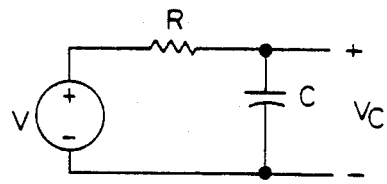

A resistance measurement circuit 500 shown in FIG. 15, designed according to the present invention, performs fast, accurate measurement of the value of an unknown resistance 502 by placing a known resistance 504 in parallel with the unknown resistance to limit the charging time, by performing an auto-calibration procedure that compensates for errors introduced by internal offset voltages and internal resistances within the circuit, and by calculating a multiplication constant, all of which increase the speed of the measurement by a factor of nearly seven without a significant sacrifice in accuracy. The resistance measurement circuit 500 is designed for accuracy up to 1 megohm because typical telephone systems have leakage that is detected at about 1 megohm. Therefore, the present invention is designed for operation in the range where accuracy is most critical, with a decrease in accuracy as the value of the unknown resistance 502 increases to 10 megohms where accuracy is not as important.

Many resistance measurement circuits use the technique of charging a capacitor, through an unknown resistance, to a preset voltage. The well-known formula for charging a capacitor is:

$$V_c = V \times (1 - e^{-T/RC}) \quad (1)$$

where $V_c$ is the voltage across the capacitor, V is the charging voltage, e represents the natural logarithm base 2.718..., T is elapsed time, and R is the value of the unknown resistance through which the current flows to charge the capacitor C, as shown in FIG. XX. If C and V are known quantities and the capacitor is initially discharged, a circuit can measure the time, T, required to charge the capacitor to a preset voltage, Vc, and thereby determine the value R of the unknown resistance by applying the formula:

$$T = -R \times C \times \ln\left[1 - \frac{V}{V_c}\right] \quad (2)$$

The drawback to this technique is that it takes a long time to charge the capacitor when a high resistance value is being measured. For example, a typical circuit with a 9-volt power supply may charge a 0.47 microfarad capacitor to 5 volts. If the unknown resistance is approximately 10 megohms, it will take approximately 3.81 seconds to charge the capacitor to the 5-volt level. This length of charging time is unacceptably long.

To overcome this difficulty, the present invention incorporates a resistor 504 of known value in parallel with the unknown resitance 502, and performs an auto-calibration procedure to compensate for internal offset voltages and resistances that would otherwise lead to measurement errors. Furthermore, the present invention uses a multiplication constant to increase the speed of calculation of the unknown resistance 502.

The resistor 504, which is in parallel with the unknown resistance 502, limits the maximum charging time that a measurement capacitor 506 will experience, in that the maximum charging time is the time to charge the measurement capacitor 506 through the parallel resistor 504 when the unknown resistance is infinite (i.e., an open circuit). This occurs when the test leads 114 and 116 are open. In the currently preferred embodiment, a 1.5 megohm, 5% tolerance resistor is used as the parallel resistor 504. The resistor value was selected to optimize measurements in the one megohm range, which is a resistance range of importance in detecting leakage in telephone lines. However, any suitable resistor in this range may be used. By adding the parallel resistor 504, the charging time is limited to an acceptable maximum duration of known length. In the presently preferred embodiment, the maximum charging time is approximately 250 milliseconds.

The measurement capacitor 506 is a low-leakage, 0.22 microfarad polyester capacitor. The low leakage is necessary to assure that the current flowing through the unknown resistance 502 is charging the measurement capacitor and not leaking into other circuitry. If the measurement capacitor 506 is not low leakage, the charging time would be longer and result in an error in the calculation of the unknown resistance 502.

When the test leads 114 and 116 are shorted together (i.e., the unknown resistance 502 is effectively zero), the charging time of the measurement capacitor 506 is at a minimum. This minimum time is determined by a series charging resistor 508, which is connected in series with the parallel resistor 504, and other internal resistances of the resistance measurement circuit 500. The series charging resistor 508 and other internal resistances of the circuit will lead to errors in the measurement of the unknown resistance 502 unless compensation is provided. Similarly, there are offset voltages present within the resistance measurement circuit 500 that will lead to errors in the measurement of the unknown resistance 502 if not taken into account.

An auto-calibration procedure takes these factors into account. When the resistance measurement option is selected by the operator to activate the resistance measurement circuit 500, the tone generator 110 provides an audible indication and the visual display 112 provides a visual indication to the operator that an auto-calibration must be performed. In response, the operator touches the two test leads 114 and 116 together so that the resistance measurement circuit 500 may measure the time required to charge the measurement capacitor 506 to a preset level of approximately one half the supply voltage (i.e., −4.5 volts). Effectively, this is the same condition as if the unknown resistance 502 had a value of zero ohms. This preset voltage level is chosen so that other circuits within the instrument will not adversely affect the resistance measurement circuit 500. If the preset voltage were set to a higher value, there would be an increase in leakage current that would cause an inaccurately high measurement for the resistance value of the unknown resistance 502. Conversely, if the preset voltage level were set too low, the charging time would be so short that an insufficient number of timer clock cycles would lead to inaccurate measurement values.

The resistance measurement circuit 500 repeats the charging-discharging-measuring time cycle until the same elapsed time is measured for five consecutive periods. This elapsed time is referred to as an offset time, $T_{OFFSET}$, and compensates for all internal resistances and offset voltages. Thus, the offset time determines how long the resistance measurement circuit 500 needs to charge the measurement capacitor 506 through the internal resistances and voltage offsets of the circuit. In this manner, the user may be assured that the resistance measurement circuit 500 is accurately calibrated. The circuit provides the user with an audible indication from the tone generator 530 and a visible indication from the LED display 532 when the resistance measurement circuit 500 has completed the auto-calibration procedure.

Referring to the circuit diagram of FIG. 15, prior to the initiation of a measurement cycle, whether it be the auto-calibration procedure just described or subsequent measurement of the unknown resistance 502 itself, a microprocessor 102 turns on transistors 510 and 512, through current limiting resistors 513 and 514, respectively, so that the measurement capacitor 606 is discharged to the level of the negative supply of a comparator 516. Transistors 510 and 512 are transistors especially suited for switching applications, but have the additional features of low leakage in the off-state and high-voltage breakdown ratings for the collector to emitter voltage. The voltage rating is important in the event that there are high voltages on the pair of wires being tested when the leads 114 and 116 are connected to the wires. A diode 540 protects the microprocessor 102 from high voltages. The instrument 100 is designed such that it is protected for voltages exceeding 300 volts.

The low-leakage characteristic for transistors 510 and 512 is important when the resistance measurement circuit 500 is not active, which results in both transistors 510 and 512 being turned off. The low leakage prevents current from leaking from the leads 114 and 116 into the resistance measurement circuit 600 through the capacitor 606, particularly when the monitor probe circuit 600 is active. The monitor probe circuit 600, discussed below, is particularly sensitive to leakage current which can cause oscillations within the monitor probe circuit. Even though capacitor 506 is chosen to have a low-leakage characteristic, less than one microamp of leakage will cause the monitor probe circuit 600 to oscillate. Transistors 510 and 512 are low leakage transistors, and any residual leakage through the measurement capacitor 506, diode 540 or transistors 510 and 512 are shunted to the tip test lead 114 through a snubber circuit made up of resistors 513, 536 and 538. The snubber circuit operation will be discussed in greater detail below. Transistor 530 provides a low resistance reference from the negative power rail of comparator 516 to the circuit ground (Vss) through a resistor 530. A filter capacitor 542, placed between the positive and negative power rails of comparator 516 help filter out power supply transients.

When a measurement cycle is initiated, transistor 510 is turned off by the microprocessor 102, which allows the previously discharged measurement capacitor 506 to charge through the parallel combination of the unknown resistance 502 and the parallel resistor 504, in series with the series charging resistor 508 and a series diode 518. A diode 520 is in series with the parallel resistor 504 to prevent leakage through the parallel resistor when the instrument 100 is used in the monitor probe mode, discussed above. A diode 518 is in series with the series charging resistor 508 to protect transistors 510 and 512 in the event of unacceptably large voltages being introduced on the input leads 114 and 116. The transistors 510 and 512 have a high-voltage rating from the collector to the emitter, but the reverse voltage rating is not sufficiently high to protect the transistors in the event of a large reverse voltage. In the preferred embodiment, diode 518 is a 1N4005 diode, which has a reverse voltage rating adequate to protect the resistance measurement circuit 500 from voltages exceeding 300 volts.

The offset voltages that result from the forward voltage drop across the diodes 518 and 520, as well as the offset voltages resulting from the comparator 516 offset and the fact that the measurement capacitor 506 does not discharge completely to circuit ground, are all potential sources of measurement error. The resistance measurement circuit 500 compensates for these errors by measuring the offset time, $T_{OFFSET}$, as described above.

When the microprocessor 102 initiates a measurement cycle, it simultaneously enables a timer 522. The measurement capacitor 506 is allowed to charge to the voltage level selected by the voltage divider comprised of resistors 524 and 526. In the present embodiment, resistors 524 and 526 are both 1.0 megohm 1% tolerance resistors. The voltage at the junction of the resistors 524 and 526 serves as a reference voltage to the positive input of the comparator 516. The voltage of the measurement capacitor 506 is coupled to the negative input of the comparator 516 through a current limiting resistor 528. The output of the comparator 516 is at a high level when the measurement capacitor 506 is discharged. When the voltage on the measurement capacitor 506 reaches the reference voltage at the positive input of the comparator 516, the output of the comparator goes low and generates a signal that disables the timer 522. The resistance measurement circuit 500 measures the elapsed time to charge the measurement capacitor 506 and then subtracts the offset time, $T_{OFFSET}$. The resulting time, $T_{CHARGE}$, is the time to charge the measurement capacitor 506 only through the unknown resistance 502.

To determine the value of the unknown resistance 502, the microprocessor 102 uses a variation of formula (2) above:

$$T = -\left[ R_s + \frac{R_p \times R_u}{R_p \times R_u} \right] \times C \times \ln\left[ 1 - \frac{\left[ \frac{R_{R1}}{R_{R1} + R_{R2}} - \frac{V_O}{V_B} \right]}{\left[ 1 - \frac{V_D}{V_B} \right]} \right] \quad (3)$$

where T is the elapsed time, $R_U$ is the unknown resistance 502, $R_P$ is the parallel resistance 504, RS is the series resistance 508, C is the measurement capacitor 506, ln represents the natural logarithm, $R_{R1}$ and $R_{R2}$ are the reference resistors 524 and 526, respectively, $V_O$ is the offset voltage on the measurement capacitor 506, $V_B$ is the supply voltage for the comparator 516 (i.e., V+ minus the negative power rail of comparator 516), and $V_D$ is the voltage drop across series diode 518.

It should be noted that the capacitance C, reference resistors $R_{R1}$ and $R_{R2}$, the offset voltage $V_O$, the comparator supply voltage $V_B$, and the diode voltage drop, $V_D$ are all constants. Therefore, it is possible to calculate a multiplication constant M as follows:

$$\frac{1}{M} = -C \times \ln\left[1 - \frac{\left[\frac{R_{R1}}{R_{R1}+R_{R2}} - \frac{V_O}{V_B}\right]}{\left[1 - \frac{V_D}{V_B}\right]}\right] \quad (4)$$

Alternatively, the offset time $T_{OFFSET}$ can also be used to calculate the multiplication constant M using the formula:

$$M = \frac{T_{OFFSET}}{R_S} \quad (5)$$

where M is the multiplication constant, $T_{OFFSET}$ is the offset time measured by the circuit during the auto-calibration procedure, and RS is the series charging resistor 508 that determines the minimum charging time. The accuracy of the resistance measurement circuit 500 in measuring the unknown resistance 502 is dependent on the accuracy of the multiplication constant calculation. Thus, the resistance measurement circuit 500 must perform an operation to accurately calculate the value of the multiplication constant M. The calculated value of the multiplication constant may be stored in memory. Alternatively, the multiplication constant M may be predetermined if the values of the circuit components are sufficiently accurate.

In the presently preferred embodiment, the resistance measurement circuit 500 uses precision components for all critical circuit components, thereby assuring accuracy without having to calculate the multiplication constant M as part of each auto-calibration procedure. The predetermined value of the multiplication constant is stored within a memory within the microprocessor 102.

During the measurement cycle, the value of the unknown resistance 502 (i.e., the resistance value $R_U$) may be calculated using the following formula:

$$R_U = R_P \times \frac{M + (T_{CHARGE})}{M - (T_{CHARGE})} \quad (6)$$

where $T_{CHARGE}$ is the elapsed time measured by the resistance measurement circuit minus the offset time $T_{OFFSET}$ measured during the auto-calibration procedure.

Figure 16:
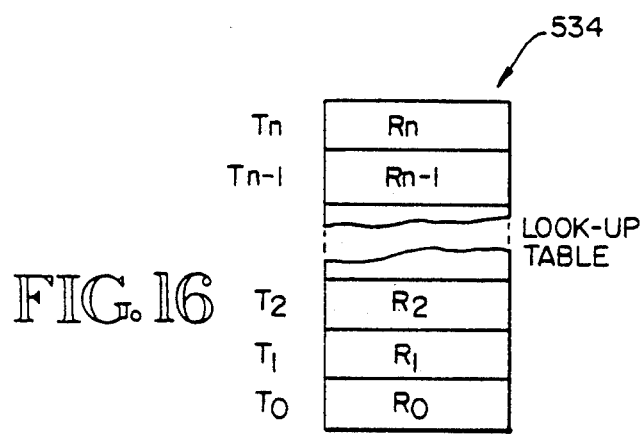
FIG. 16 depicts a look-up table for determining resistance values comprising the resistance measurement circuit of FIG. 15.

As an alternative to calculating the resistance value $R_U$, it is possible to prestore resistance values in a look-up table 534, as shown in FIG. 16. The look-up table 534 stores resistance values based on typical charging times $T_{CHARGE}$ (i.e., the elapsed time minus the offset time). The resistance values are stored as a function of the charging time $T_{CHARGE}$, the parallel resistance 504, and the multiplication constant M. When the resistance measurement circuit 500 determines the measured elapsed time minus the measured offset time, it simply looks in the look-up table 534 for a typical stored time $T_{CHARGE}$ that most closely approximates the measured time. The stored resistance entry corresponding to the looked-up time entry is used as the value of the unknown resistance 502.

The resistance measurement circuit 500 indicates this measured value of the unknown resistance 502 by an audible signal from the tone generator 530 and by the visual indicator 532. The tone generator 530 generates a tone whose frequency is proportional to the value of the measured unknown resistance 502. Thus, as the measured value of the unknown resistance decreases, the frequency of the tone bursts generated by the tone generator 110 increases. The resistance measurement circuit 500 also gives a visual indication of the measured value of the unknown resistance 502 on the visual indicator 532 either by lighting up a single LED from the series of LEDs 112a-f (see FIG. 1) which corresponds to the range of the measured value of the unknown resistance 502 or in the form of a bar graph option, as selected by the user. When the bar graph option is selected, the resistance measurement circuit 500 lights up the particular LEDs of the LEDs 112a-f that correspond to the measured value and all lower values to form a bar graph presentation with a higher measured value of the unknown resistance 502, resulting in a corresponding increase in the number of LEDs that are lighted.

MONITOR PROBE

The monitor probe circuit 600 of the instrument 100 comprises an amplifier with an inductive input lead. In prior art instruments, it was not possible to integrate this feature into a test instrument because of the high gain and high input impedance design required for a monitor probe circuit to function properly. These two requirements make a monitor probe circuit susceptible to oscillations caused by any stray currents within the instrument. Therefore, the prior art instruments sometimes performed the functions of tone generation, resistance measurement, etc., but always required the purchase of a separate instrument which only performed the monitor probe function. The instrument 100 of the present invention successfully integrates all of the standard functions, including the monitor probe function into a single handheld instrument. This is accomplished by careful design and layout of the monitor probe circuit 600 and a redesigning of all other circuits which provide the standard functions such as tone generating and resistance measurement, so that these circuits will not interfere with the proper operation of the monitor probe circuit.

In addition, the monitor probe circuit 600 intentionally utilizes feedback in particular areas of the circuit in order to reduce oscillations. The monitor probe circuit 600 has a differential input, which amplifies differential signals while rejecting common mode signals. By adding feedback to certain parts of the circuit, the monitor probe circuit converts a differential mode signal to a common mode signal, thereby reducing the chances of spurious oscillations.

The monitor probe mode is the alternate mode of the monitor function and is selected when the user depresses MON switch 126g and holds the switch in the depressed position for at least one second. When the monitor probe mode is selected, the test lead 116 becomes the inductive input to an operational amplifier 602 through a decoupling capacitor 604 and a gain-setting resistor 606, as shown in FIG. 17. The amplifier 602 performs as a differential amplifier that is referenced to the test lead 116 through a reference resistor 610 having a capacitor 611 connected in parallel therewith. The gain of the amplifier 602 is set by the gain select resistor 606 and a feedback resistor 608.

The amplifier 602 is particularly susceptible to variations in current to the circuit ground ($V_{SS}$) which provides positive feedback to the amplifier 602. Therefore, it is necessary to isolate the amplifier 602 from variations in $V_{SS}$ in order to prevent oscillations. Furthermore, the Ring test lead 116 (i.e., the inductive input of the amplifier 602) is connected to every other circuit in the instrument 100, including a tone-generator circuit (not shown), the line condition monitor circuit 200, the continuity/discontinuity circuit 300, the talk battery circuit 400, and the resistance measurement circuit 500. All of these other circuits have potential leakage pathways to $V_{SS}$. Even leakage currents as low as 0.01 microamps will cause oscillation in the monitor probe circuit 600. Thus, it is necessary to completely isolate all of these circuits from the test lead 116 whenever the monitor probe circuit 600 is active. This is accomplished by a variety of techniques, as will be described below.

The tone driver circuit (not shown) uses two transistors which are low-leakage transistors when turned off. One of these transistors is transistor 308 which is also used for the continuity/discontinuity circuit 300 when the alternate threshold is selected, as discussed previously. The microprocessor 102 turns off both transistors when the monitor probe circuit 600 is active. Despite the low leakage ratings of the transistors, some leakage still occurs and will cause oscillations unless compensation is provided. As shown in FIG. 6, the collector of transistor 308 is connected to the power supply V+ (which is the same as the Tip test lead 114) through the snubber circuit 346 comprised of a resistor 348 and a capacitor 350, which are connected in parallel. The snubber circuit 346 presents a low resistance pathway to the test lead 114 when compared to the resistance of the transistor 308 leakage pathway to $V_{SS}$. Any leakage current that would flow through the transistor 308 instead flows through the lower resistance pathway of the snubber circuit 346 to the test lead 114 rather than the higher resistance pathway through transistor 308 to circuit ground $V_{SS}$. Thus, the leakage signal has been converted from a differential signal only present on the test lead 116 to a common mode signal present on both test leads 114 and 116, which is rejected by the differential amplifier 602.

Similarly, the talk battery circuit 400 uses the same transistor 338 as the continuity/discontinuity circuit 300 (see FIGS. 7 and 11), when the talk battery circuit is in the primary mode, as previously discussed. When the monitor probe circuit 600 is active, the microprocessor 102 turns off transistor 338. However, as discussed above, some leakage may still occur despite the low leakage rating of transistor 338. The additional snubber circuit 352 shown in FIG. 7 comprising a resistor 354 and a capacitor 356 connected in parallel snub any leakage current and shunt the leakage current to the test lead 114, which is the reference for amplifier 602. The leakage is thereby converted to a common mode signal and rejected by amplifier 602.

The resistance measurement circuit 500, discussed above, is also a potential source of leakage current. When the resistance measurement circuit is active, transistors 510, 512, and 532 shown in FIG. 15 are all turned on by the microprocessor 102 through current limiting resistors 513, 514, and 534, respectively. Transistor 532 provides comparator 516 with a low resistance reference to the circuit ground $V_{SS}$ through a resistor 530. In the present embodiment, resistor 530 is 20,000 ohms. Transistor 532 is a general purpose switching transistor.

When the monitor probe circuit 600 is active, the microprocessor 102 turns off transistors 510 and 512. Transistors 510 and 512 are chosen for their low leakage current characteristics, but some residual leakage may still occur through the measurement capacitor 506 and diode 540 as well as through the transistors 510 and 512. Therefore, a snubber circuit comprising three resistors 536, 513, and 538 present a low resistance pathway to the test lead 114 compared to the high resistance leakage pathway through transistor 512 to $V_{SS}$.

A unique feature of the resistance measurement circuit 500 of FIG. 15 is the addition of a parallel resistor 504 across the test leads 114 and 116 to reduce the time required to charge the measurement capacitor 506. When the monitor probe circuit 600 is active, the high impedance of the amplifier 602 causes the test leads effectively to float. In this mode, the test lead 116 floats approximately 0.5 volts below the level of the test lead 114. This means that a diode 520, placed in series with the parallel resistor 504, is slightly forward biased, but is not turned on. The diode 520 was chosen for its extremely low leakage characteristics. In the present embodiment of the invention, diode 520 is a 1N914 diode. The extremely low leakage through the diode 520 effectively removes resistor 504 from the circuit when the monitor probe circuit 600 is active.

Transistor 532 is still turned on because it provides the $V_{SS}$ reference to the negative supply rail of comparator 516. The comparator 516 is one half of a dual operational amplifier integrated circuit. The inductive monitor probe amplifier 602 is the other of the amplifiers. Thus, transistor 532 must be active during all monitor functions to provide a $V_{SS}$ reference to amplifier 602. There is negligible leakage through the input of comparator 516 when the monitor probe circuit 600 is active because the input impedance of comparator 516 is greater than 100 megohms.

The line condition monitor circuit 200 is continuously active in all modes of the instrument 100, including the monitor probe mode. The leakage in this circuit is negligible because the inputs to the line condition monitor circuit 200 are all through low leakage diodes 202, 214, 230, and 236 as shown in FIG. 3. In the present embodiment of the invention, all four diodes are 1N914 diodes, which have extremely low leakage currents. Since the test leads 114 and 116 are floating, the diodes 202, 214, 230, and 236 do not conduct. The line condition monitor circuit 200 is thereby effectively eliminated from the circuit when the monitor probe circuit 600 is active.

In addition to eliminating leakage currents, the monitor probe circuit 600 shown in FIG. 17 filters the power supply across the power supply leads of the amplifier 602 using a capacitor 542 to isolate the amplifier 602 from variations in current that are sensed by $V_{ss}$. The amplifier 602 is referenced to the test lead 114 as described above. The speaker amplifier 130 is referenced to $V_{ss}$. To convert from the test lead 114 reference to a $V_{ss}$ reference, the monitor probe circuit 600 uses a transconductance amplifier formed by the voltage source output from amplifier 602 and a transistor 614 which is configured as a current source. The current output of transistor 614 passes through a current-limiting resistor 616 connected to power supply V+ and a resistor 618 connected to the circuit reference $V_{ss}$. The voltage created on resistor 618 is the input of the speaker amplifier 130 via the mux 132. The output of speaker amplifier 130 passes through a decoupling capacitor 620 to the speaker 131.

The speaker amplifier 130 draws substantial amounts of current, which causes variations in the voltage of circuit ground $V_{ss}$. Capacitor 542 is in series with resistor 530 and transistor 532 to form a 0.8 Hz low pass filter from V+ to $V_{ss}$. This filter reduces the effect of voltage variations in $V_{ss}$ on the operation of amplifier 602.

In addition to the circuit design, which incorporates features to reduce leakage currents and voltage fluctuations, the monitor probe circuit 600 is carefully laid out on the printed circuit board so that lead lengths are kept to a minimum. A large conductive Faraday shield 622, shown schematically in FIG. 17, is positioned adjacent to the printed circuit trace and is connected to the test lead 114, to provide capacitive coupling to the test lead 114 instead of a pathway to the circuit ground $V_{ss}$.

It will be appreciated that, although specific embodiments of the invention have been described herein for purposes of illustration, the various modifications may be made without departing from the spirit or scope of the invention. Accordingly, the invention is not limited except by the appended claims.

We claim:

1. A portable, self-powered telecommunications test instrument for use by two or more persons with telephone sets at locations separate from each other with a pair of wires extending between the instrument and the locations of the two or more persons, the telephone sets being connected to the pair of wires, the instrument comprising:
   a case sized to be held in one hand and containing therein the circuitry of the instrument;
   a battery;
   a power source powered by said battery and supplying electrical power to the pair of wires to power the two or more telephone sets, said power source selectively operating as a voltage source or a current source;
   means for connecting said power source to the pair of wires; and
   conversion means for automatically operating said power source as a voltage source when the telephone sets are connected in series and operating said power source as a current source when the telephone sets are connected in parallel, whereby the portable, battery powered telecommunications test instrument automatically converts said power source between operation as a current source and operation as a voltage source depending on the manner in which the telephone sets are connected at the locations.

2. The instrument of claim 1 wherein said conversion means converts said power source between a voltage source and a current source by sensing the amount of current flowing from said power source through the telephone sets connected to the pair of wires.

3. The instrument of claim 2 wherein said conversion means causes said power source to operate as a voltage source if said current flow is below a predetermined value and to operate as a current source if said current flow is above said predetermined level.

4. The instrument of claim 1 further including means for limiting current flow from said power source to the pair of wires when the telephone sets are not in use in order to extend the life of said battery.

5. The instrument of claim 4 wherein said limiting means determines if the telephones are in use based on the amount of current flowing through the telephone sets connected to the pair of wires.

6. The instrument of claim 1 further including means for automatically detecting the presence of other signals on the pair of wires, and if other signals are present, disabling said power source to prevent use of the pair of wires for communications between the locations.

7. A portable, self-powered telecommunications test instrument for use by a person at the location of the instrument and one or more other persons at locations remote from the instrument with a pair of wires extending between the instrument and the remote locations of the one or more other persons, the one or more other persons at the remote locations having telephone sets connected to the pair of wires, the instrument comprising:
   a case sized to be held in one hand and containing therein the circuitry of the instrument;
   a battery;
   a power source powered by said battery and supplying electrical power to the pair of wires to power the two or more telephone sets, said power source operating as a voltage source when the telephone sets are connected in series with the pair of wires;
   means for connecting said power source to the pair of wires;
   a speaker being connected to an amplifier which amplifies the voice signals on the pair of wires and provides said amplified signals to said speaker for listening to communications over the telephone sets originating at the remote locations; and
   conversion means for automatically operating said power source as a voltage source when the telephone sets are connected in series and operating said power source as a current source when the telephone sets are connected in parallel, whereby the portable, battery powered telecommunications test instrument automatically converts said power source between operation as a current source and operation as a voltage source depending on the manner in which the telephone sets are connected at separate remote locations and allows monitoring of the communications over the telephone lines over said speaker.

8. A portable, self-powered telecommunications test instrument for use by two or more persons with telephone sets at locations separate from each other with a pair of wires extending between the instrument and the locations of the two or more persons, the telephone sets being connected to the pair of wires, the instrument comprising:
   a case sized to be held in one hand and containing therein the circuitry of the instrument;
   a connector to connect said circuitry to the pair of wires;
   a battery having a positive terminal and a negative terminal, said positive terminal being connected to one of the pair of wires through said connector;
   a switch manually controlled by the user to select a telephone power mode;
   a controller, responsive to said switch, to control the flow of current through the telephones;
   a clamping diode selected to conduct current at a preselected voltage level;
   a resistor to sense said current flow;
   first and second current-limiting resistors;

first and second transistors, each having a collector, a base, and an emitter, said collector of said first transistor being coupled to the other of the pair of wires through said connector, said collector of said second transistor being coupled to said emitter of said first transistor through said current sensing resistor, said emitter of said second transistor being coupled to said negative terminal to conduct said current flow to said negative terminal, said bases of said first and said second transistors being coupled to said controller through said first and said second current limiting resistors, respectively, said controller providing drive current to turn on said first and second transistors when said switch indicates selection of said telephone power mode by the user, said base of said first transistor also being coupled to said clamping diode, said first and second transistors providing power for the telephone sets by permitting said current flow from said battery through the telephone sets, said current flow being unregulated until said current flow creates a sufficient voltage on said current-sensing resistor to cause a voltage on said clamping diode equal to said preselected voltage level, causing said clamping diode to conduct and clamp said base of said first transistor at said preselected voltage level, and thereby limit said current flow to a substantially constant value determined by said current sensing resistor and said preselected voltage level.

* * * * *